(12) United States Patent
Wilkins et al.

(10) Patent No.: US 11,868,456 B2
(45) Date of Patent: Jan. 9, 2024

(54) MODULAR BIOMETRIC STATION WITH COHESIVE FORM FACTOR

(71) Applicant: Alclear, LLC, New York, NY (US)

(72) Inventors: Matthew Wilkins, Brooklyn, NY (US); Austin Puckett, Brooklyn, NY (US); Raymond Protasiewicz, Whippany, NJ (US); Aditi Vyas, Phoenix, AZ (US); Travis Baldwin, Bristol (GB); Gregory Sparks, New York, NY (US); Navni Garg, New York, NY (US); Nicholas Oxley, Brooklyn, NY (US)

(73) Assignee: SECURE IDENTITY, LLC, New York, NY (US)

( * ) Notice: Subject to any disclaimer, the term of this patent is extended or adjusted under 35 U.S.C. 154(b) by 329 days.

(21) Appl. No.: 17/319,939

(22) Filed: May 13, 2021

(65) Prior Publication Data
US 2021/0357487 A1    Nov. 18, 2021

Related U.S. Application Data

(60) Provisional application No. 63/023,916, filed on May 13, 2020.

(51) Int. Cl.
| | |
|---|---|
| *G06F 21/32* | (2013.01) |
| *H04L 9/40* | (2022.01) |
| *G06F 21/62* | (2013.01) |
| *H04W 12/06* | (2021.01) |

(52) U.S. Cl.
CPC .......... *G06F 21/32* (2013.01); *G06F 21/6245* (2013.01); *H04L 63/0853* (2013.01); *H04L 63/0861* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 7,346,728 B1 * | 3/2008 | Jackson | G06F 13/4045 |
| | | | 710/62 |
| 7,895,384 B2 * | 2/2011 | Matsui | G06F 1/266 |
| | | | 200/51.14 |

(Continued)

*Primary Examiner* — Piotr Poltorak
(74) *Attorney, Agent, or Firm* — Brownstein Hyatt Farber Schreck, LLP

(57) ABSTRACT

A modular biometric station system is used to form one or more modular biometric stations with cohesive form factors. Such biometric stations include a core unit, one or more end caps, and one or more modules. The modules may be configured to communicably and electrically couple to one or more of the end caps. The end caps may be configured to communicably and electrically couple to the core unit and/or one or more of the modules and may communicably and electrically couple one or more of the modules to the core unit. The core unit, end caps, and/or the modules may be able to communicably interact when coupled together. The core unit, end caps, and modules may all share a form factor. The core unit may include hardware and/or software that satisfies common requirements, and the modules may include peripherals and/or other components that can be coupled to the core unit to adapt the modular biometric station to a variety of different needs of different applications.

24 Claims, 41 Drawing Sheets

(56) References Cited

U.S. PATENT DOCUMENTS

| | | | |
|---|---|---|---|
| 8,043,099 B1* | 10/2011 | Ni | G06K 19/07732 |
| | | | 439/131 |
| 8,381,969 B1 | 2/2013 | Miller et al. | |
| 8,423,462 B1 | 4/2013 | Amacker et al. | |
| 8,521,131 B1 | 8/2013 | Ramalingam et al. | |
| 8,690,600 B1* | 4/2014 | Zeolla | G06F 1/1628 |
| | | | 439/502 |
| 8,744,966 B1 | 6/2014 | Amacker et al. | |
| 8,965,170 B1 | 2/2015 | Benea | |
| 9,107,064 B1 | 8/2015 | Ramalingam et al. | |
| 9,166,961 B1 | 10/2015 | Johansson et al. | |
| 9,202,105 B1 | 12/2015 | Wang et al. | |
| 9,324,098 B1 | 4/2016 | Agrawal et al. | |
| 9,386,507 B1 | 7/2016 | Ramalingam et al. | |
| 9,607,138 B1 | 3/2017 | Baldwin et al. | |
| 9,609,577 B1 | 3/2017 | Ramalingam et al. | |
| 9,681,350 B1 | 6/2017 | Marupaduga et al. | |
| 9,681,359 B2 | 6/2017 | Ramalingam et al. | |
| 9,723,131 B1 | 8/2017 | Ramalingam et al. | |
| 9,836,642 B1 | 12/2017 | Ramaswamy | |
| 9,934,504 B2 | 4/2018 | Wang et al. | |
| 9,967,250 B2 | 5/2018 | Johansson et al. | |
| 10,027,662 B1 | 7/2018 | Mutagi et al. | |
| 10,055,740 B2 | 8/2018 | Hanson et al. | |
| 10,104,181 B1 | 10/2018 | Rao et al. | |
| 10,108,791 B1 | 10/2018 | Masterman | |
| 10,108,961 B2 | 10/2018 | Wang et al. | |
| 10,122,727 B2 | 11/2018 | Johansson et al. | |
| 10,235,669 B2 | 3/2019 | Amacker et al. | |
| 10,242,364 B2 | 3/2019 | Wang et al. | |
| 10,243,945 B1 | 3/2019 | Kruse et al. | |
| 10,699,502 B2* | 6/2020 | Tagawa | G06V 10/147 |
| 10,867,612 B1* | 12/2020 | Pollack | G10L 17/10 |
| 11,151,481 B1 | 10/2021 | Sun et al. | |
| 11,227,155 B2* | 1/2022 | Willis | G06V 40/197 |
| 11,295,566 B2* | 4/2022 | Trelin | G06V 40/1365 |
| 11,310,228 B1* | 4/2022 | Rao | G06V 40/172 |
| 11,496,471 B2* | 11/2022 | Whitman | H04L 63/0861 |
| 2004/0221303 A1 | 11/2004 | Sie | |
| 2004/0254861 A1* | 12/2004 | Pentel | G07G 1/14 |
| | | | 235/384 |
| 2005/0230484 A1* | 10/2005 | Cuellar | G06K 19/077 |
| | | | 235/492 |
| 2006/0260988 A1* | 11/2006 | Schneider | G06F 18/2415 |
| | | | 209/583 |
| 2008/0177922 A1* | 7/2008 | Chow | G06F 11/2221 |
| | | | 711/115 |
| 2008/0252414 A1* | 10/2008 | Crigger | A47B 81/005 |
| | | | 211/64 |
| 2009/0080708 A1* | 3/2009 | Mellen | G06F 21/32 |
| | | | 382/115 |
| 2010/0127069 A1* | 5/2010 | Henton, Sr. | G06Q 20/40145 |
| | | | 235/379 |
| 2013/0067546 A1* | 3/2013 | Thavasi | G06F 21/31 |
| | | | 726/7 |
| 2014/0189720 A1 | 7/2014 | Terrazas | |
| 2015/0036898 A1* | 2/2015 | Cohen | G06V 40/13 |
| | | | 382/126 |
| 2015/0294515 A1 | 10/2015 | Bergdale | |
| 2016/0189063 A1 | 6/2016 | Nie | |
| 2016/0301163 A1* | 10/2016 | Yin | H01R 24/60 |
| 2017/0069148 A1* | 3/2017 | Gilbertson | G07C 9/257 |
| 2017/0103160 A1* | 4/2017 | Hynes | G09B 9/058 |
| 2017/0188103 A1 | 6/2017 | Pan | |
| 2018/0007060 A1 | 1/2018 | Leblang et al. | |
| 2019/0036939 A1 | 1/2019 | Johansson et al. | |
| 2019/0050631 A1 | 2/2019 | Hayase | |
| 2019/0065719 A1* | 2/2019 | Higuchi | G06F 21/32 |
| 2020/0213301 A1* | 7/2020 | Wisniewski | G07C 9/37 |
| 2021/0064727 A1* | 3/2021 | Bresnahan | G06F 3/03547 |
| 2021/0233500 A1* | 7/2021 | Sinha | G06V 40/18 |
| 2021/0357489 A1* | 11/2021 | Tali | A61B 5/349 |
| 2022/0012451 A1* | 1/2022 | Sargent | G06F 3/04847 |
| 2023/0126015 A1* | 4/2023 | Inoue | G06V 20/53 |
| | | | 340/5.7 |

* cited by examiner

FIG. 1C

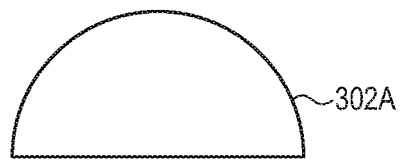
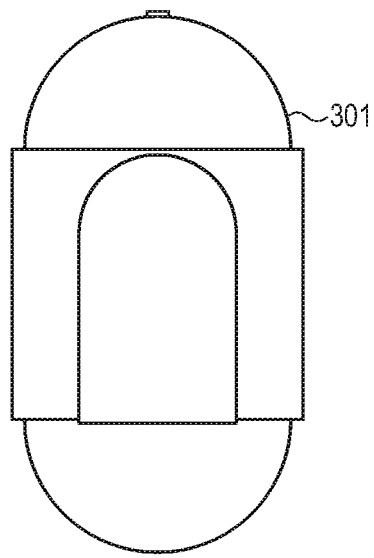
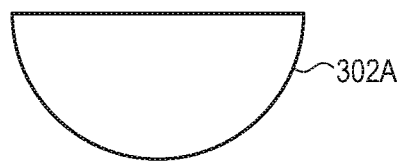
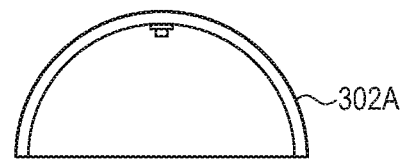
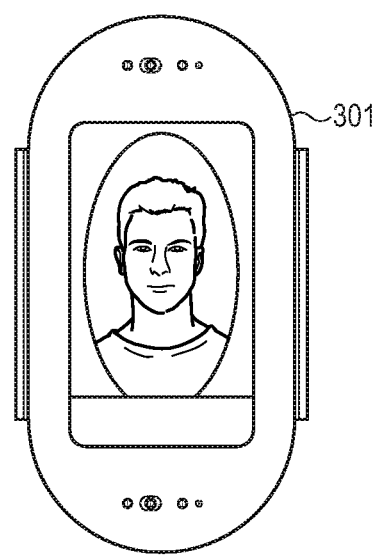
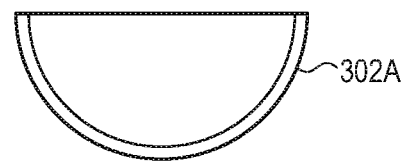
FIG. 3A                    FIG. 3B

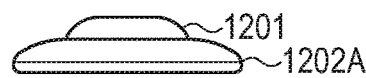
FIG. 12A  FIG. 12B
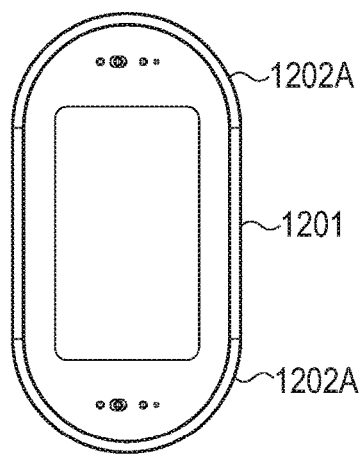
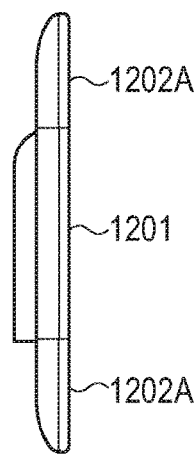
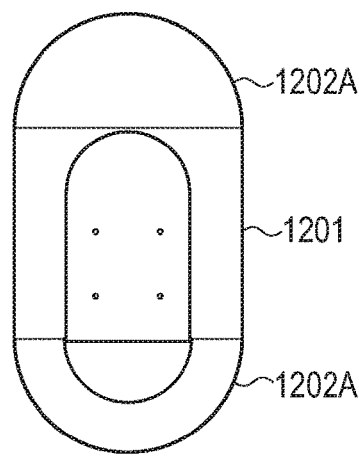
FIG. 12C  FIG. 12D  FIG. 12E
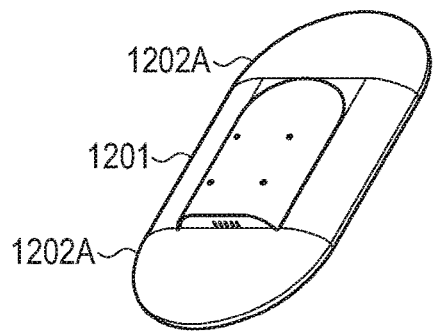
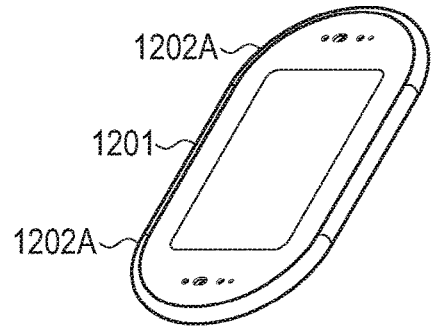
FIG. 12F  FIG. 12G

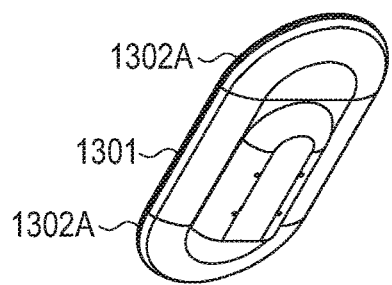
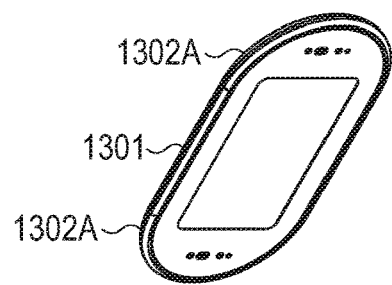
FIG. 13A  FIG. 13B
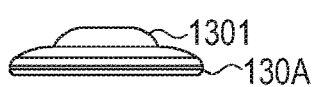
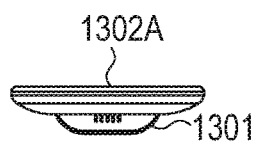
FIG. 13C  FIG. 13D
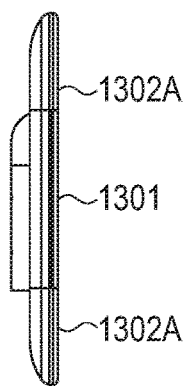
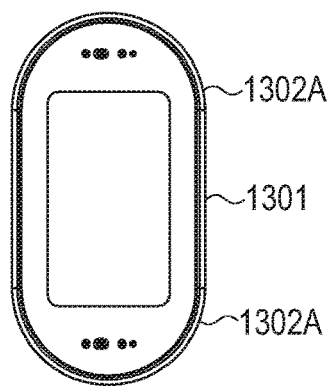
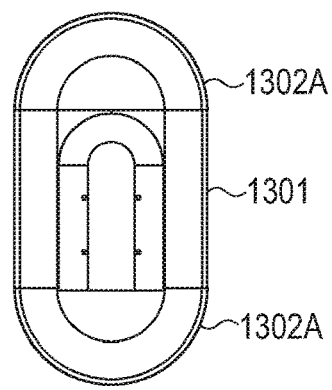
FIG. 13E  FIG. 13F  FIG. 13G
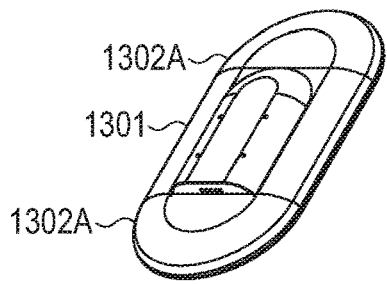
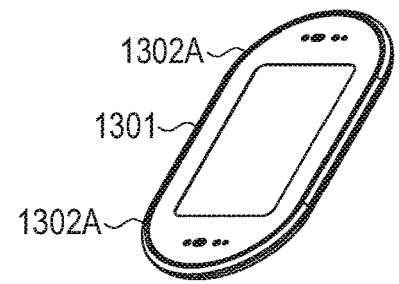
FIG. 13H  FIG. 13I

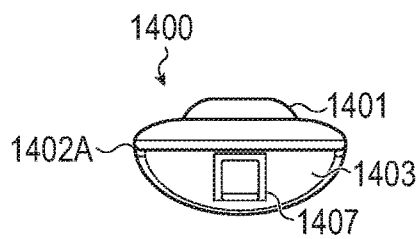
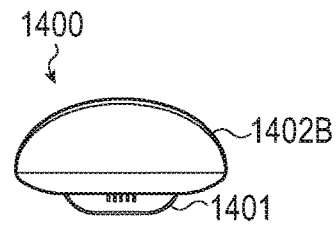
FIG. 14A      FIG. 14B
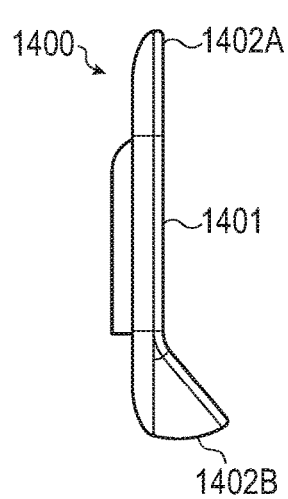
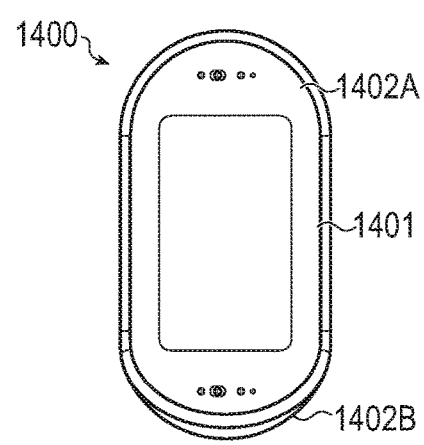
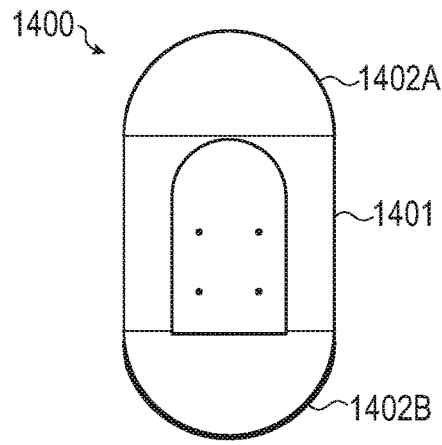
FIG. 14C      FIG. 14D      FIG. 14E
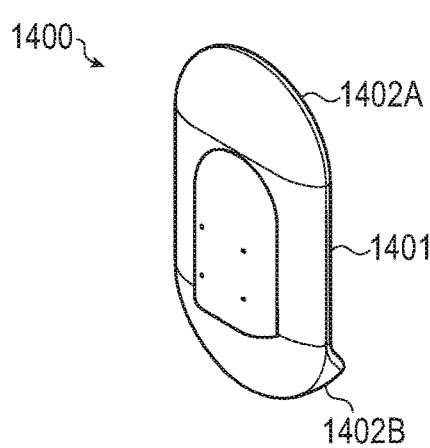
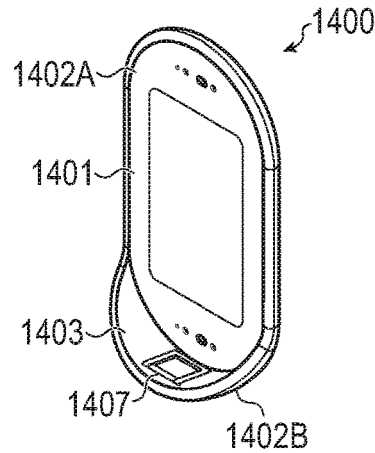
FIG. 14F      FIG. 14G

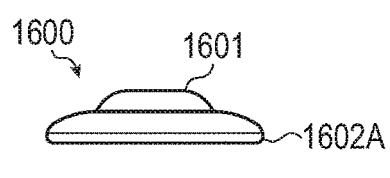
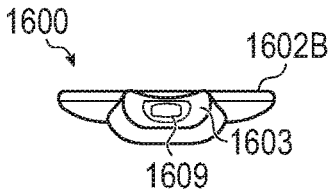
FIG. 16A  FIG. 16B
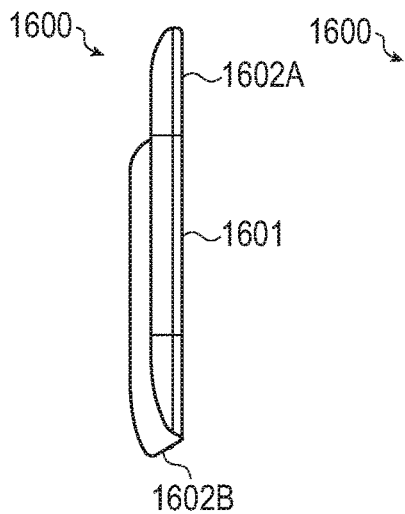
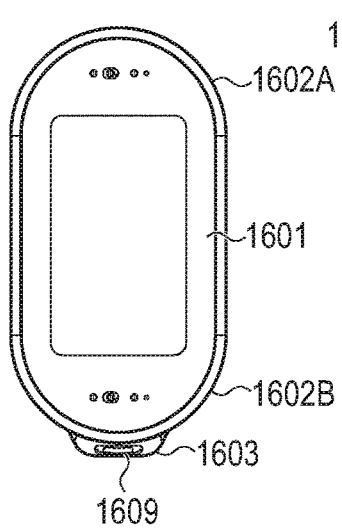
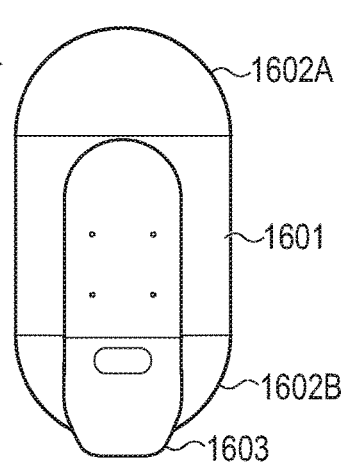
FIG. 16C  FIG. 16D  FIG. 16E
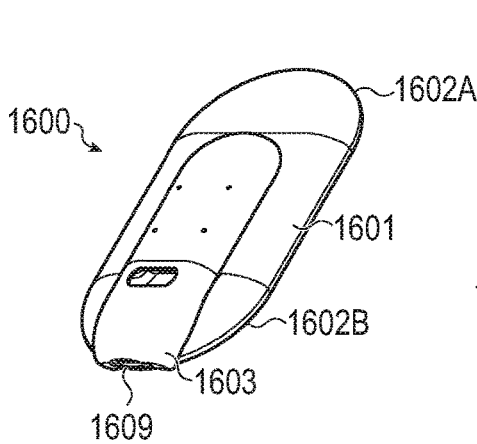
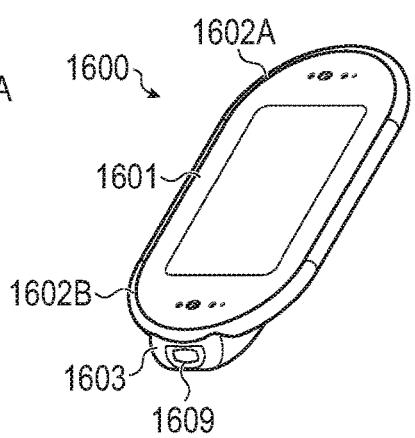
FIG. 16F  FIG. 16G

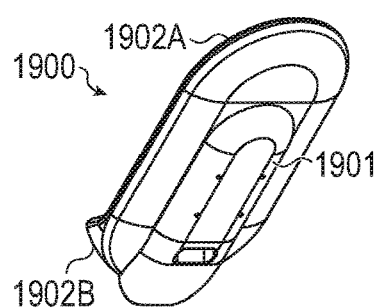
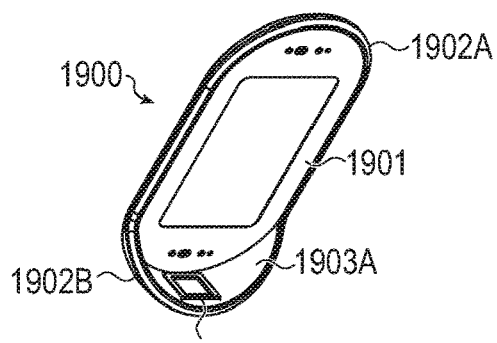
FIG. 19A  FIG. 19B
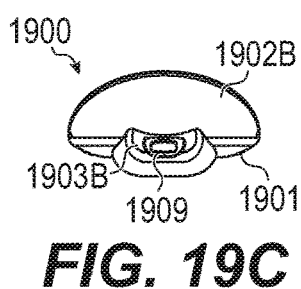
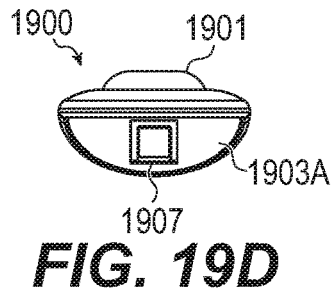
FIG. 19C  FIG. 19D
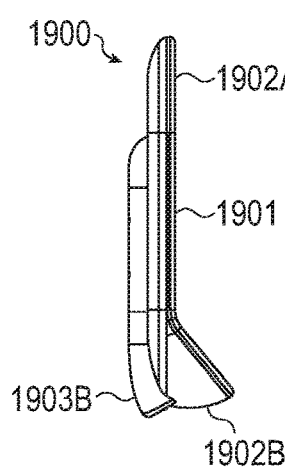
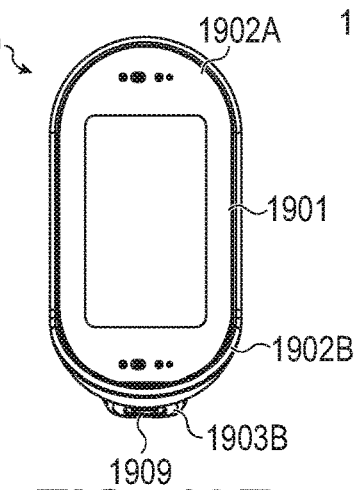
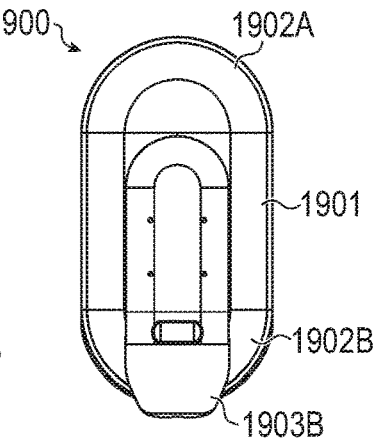
FIG. 19E  FIG. 19F  FIG. 19G
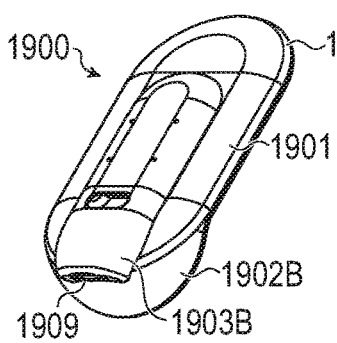
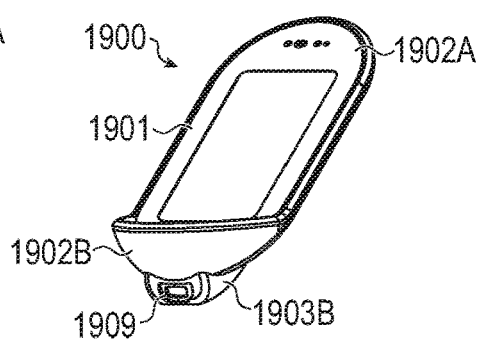
FIG. 19H  FIG. 19I

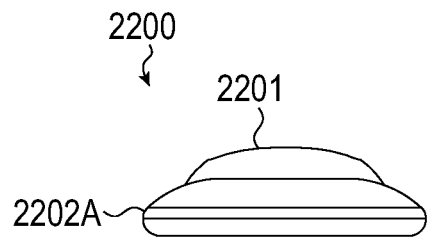
FIG. 22A
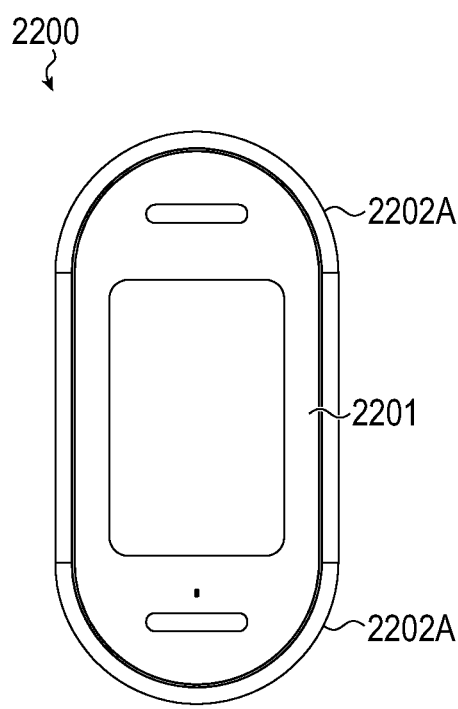 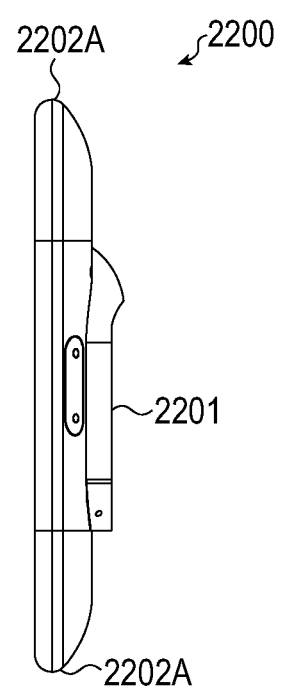
FIG. 22B   FIG. 22C

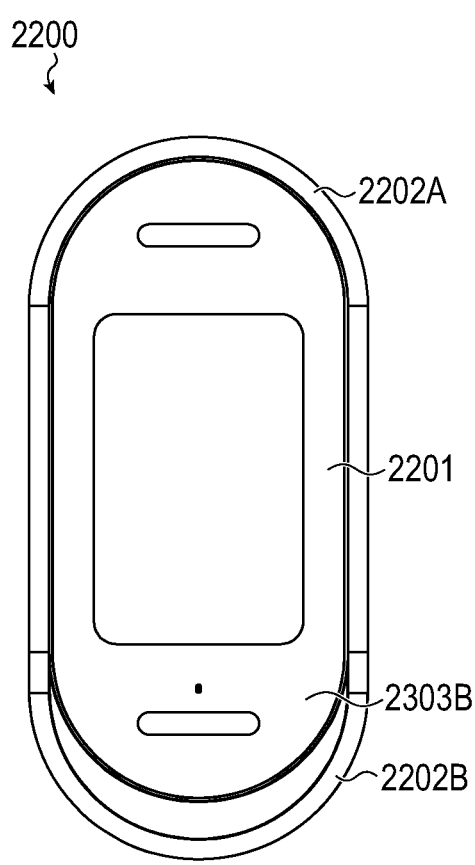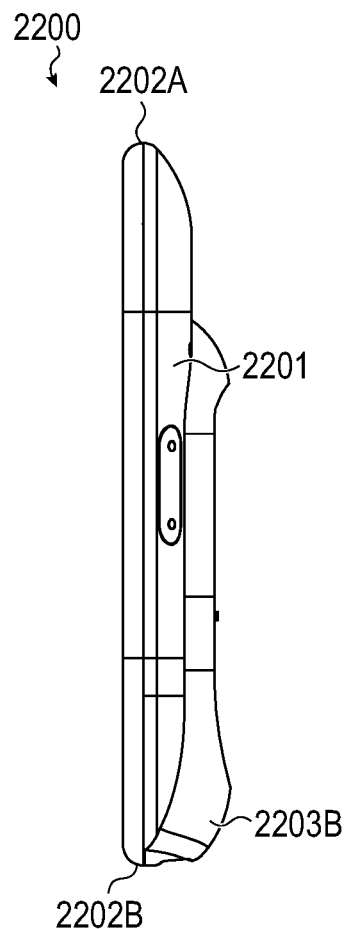
FIG. 22L
FIG. 22M
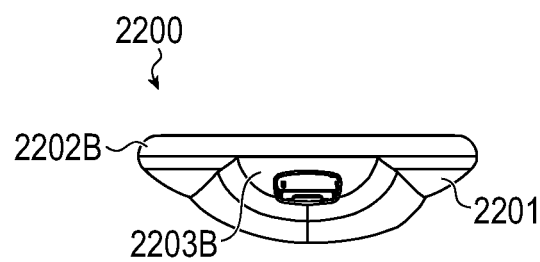
FIG. 22N

MODULAR BIOMETRIC STATION WITH COHESIVE FORM FACTOR

CROSS-REFERENCE TO RELATED APPLICATION(S)

This application is a nonprovisional patent application of and claims the benefit of U.S. Provisional Patent Application No. 63/023,916, filed May 13, 2020 and titled "Modular Biometric Station with Cohesive Form Factor," the disclosure of which is hereby incorporated herein by reference in its entirety.

FIELD

The described embodiments relate generally to biometrics. More particularly, the present embodiments relate to a modular biometric station with a cohesive form factor.

BACKGROUND

The term "biometrics" generally refers to body measurements and calculations and/or other metrics related to human characteristics. Biometrics may be used for purposes of identification, authorization, access control, and so on.

For example, a fingerprint is an example of a biometric. Data representative of a fingerprint may be obtained via a fingerprint scanner and/or other biometric reader device and compared to stored fingerprint data as part of biometric identification.

SUMMARY

The present disclosure relates to a modular biometric station system that may be used to form one or more modular biometric stations with cohesive form factors. The modular biometric station system may be used to form one or more biometric stations that include a core unit, one or more end caps, and one or more modules. The modules may be configured to communicably and electrically couple to one or more of the end caps. The end caps may be configured to communicably and electrically couple to the core unit and/or one or more of the modules and may communicably and electrically couple one or more of the modules to the core unit. The core unit, the end caps, and/or the modules may be able to communicably interact when coupled together. The core unit, end caps, and modules may all share a form factor. The core unit may include hardware and/or software that satisfies common requirements, and the modules may include peripherals and/or other components that can be coupled to the core unit to adapt the modular biometric station to a variety of different needs of different applications. In this way, a single biometric station may be designed and used, whether or not with any of the modules and/or multiple modules, for all of the various applications for which the biometric station is to be used.

In various embodiments, a modular biometric station system includes a core unit circuitry, a number of modules, a standalone end cap, and at least one module end cap. The core unit includes a display, at least one camera, at least one lighting component, at least a top port and a bottom port, and circuitry operable to detect power requirements of at least one component coupled to at least one of the top port or the bottom port and provide power according to the power requirements. The standalone end cap is communicably and electrically coupleable to at least one of the top port or the bottom port. The at least one module end cap is communicably and electrically coupleable to at least one of the top port or the bottom port, communicably and electrically coupleable to the number of modules, and operable to communicably and electrically connect a module of the number of modules and the core unit while connected to the module of the number of modules and the core unit.

In some examples, the module includes a bar code reader. In a number of examples, the at least one lighting component is a first lighting component and the module includes a second lighting component. In various examples, the module includes a fingerprint scanner. In some examples, the module includes a thermal sensor. In some examples, the module includes a card reader. In some examples, the module is operable to perform glasses detection.

In a number of examples, the end cap is operable to cover at least one of the top port or the bottom port. In some examples, the core unit is operable to use the at least one camera to perform facial recognition. In a number of examples, the at least one lighting component is a first lighting component that is operable to perform a first lighting function and the module includes a second lighting component that is operable to perform a second lighting function.

In some embodiments, a modular biometric station includes a core unit. The core unit has at least a top connector and a bottom connector and circuitry operable to detect power requirements of at least one component coupled to at least one of the top connector or the bottom connector and provide power according to the power requirements. The modular biometric station also includes a module end cap that is communicably and electrically coupled to a first of the top connector and the bottom connector and incudes a first lighting component, a standalone end cap that is communicably and electrically coupled to a second of the top connector and the bottom connector and includes a second lighting component, and a module that is communicably and electrically communicably coupled to the first of the top connector and the bottom connector via the module end cap.

In various examples, the standalone end cap is a first standalone end cap, the module end cap is non-destructively removable from the first of the top connector and the bottom connector, and a second standalone end cap is configured to communicably and electrically couple to the first of the top connector and the bottom connector after the module end cap is non-destructively removed. In a number of examples, the top connector and the bottom connector are universal serial bus connectors. In various examples, the core unit further includes a first side connector and a second side connector. In some implementations of such examples, the first side connector is positioned on an opposite side of the core unit from the second side connector.

In a number of embodiments, a modular biometric station includes a core unit, circuitry, and a standalone end cap. The core unit has at least a top connector and a bottom connector. The circuitry is operable to detect power requirements of at least one component coupled to at least one of the top connector or the bottom connector and provide power according to the power requirements. The standalone end cap is communicably and electrically coupled to one of the top connector and the bottom connector and includes a first lighting component. The standalone end cap is non-destructively removable from the one of the top connector and the bottom connector. A module end cap that includes a second lighting component is configured to communicably and electrically couple to the one of the top connector and the bottom connector after the standalone end cap is non-destructively removed. A module is configured to communicably and electrically couple to the one of the top connector and the bottom connector via the module end cap.

In various examples, the core unit is operable to perform biometric identification. In some examples, the core unit is operable to perform a first type of biometric identification and the core unit is operable to use the module to perform a second type of biometric identification when the module is communicably and electrically coupled to the one of the top connector and the bottom connector via the module end cap. In a number of examples, the core unit is operable to communicate with a biometric identification system. In various examples, the core unit is operable to perform glasses detection.

BRIEF DESCRIPTION OF THE DRAWINGS

The disclosure will be readily understood by the following detailed description in conjunction with the accompanying drawings, wherein like reference numerals designate like structural elements.

Figure 1C:
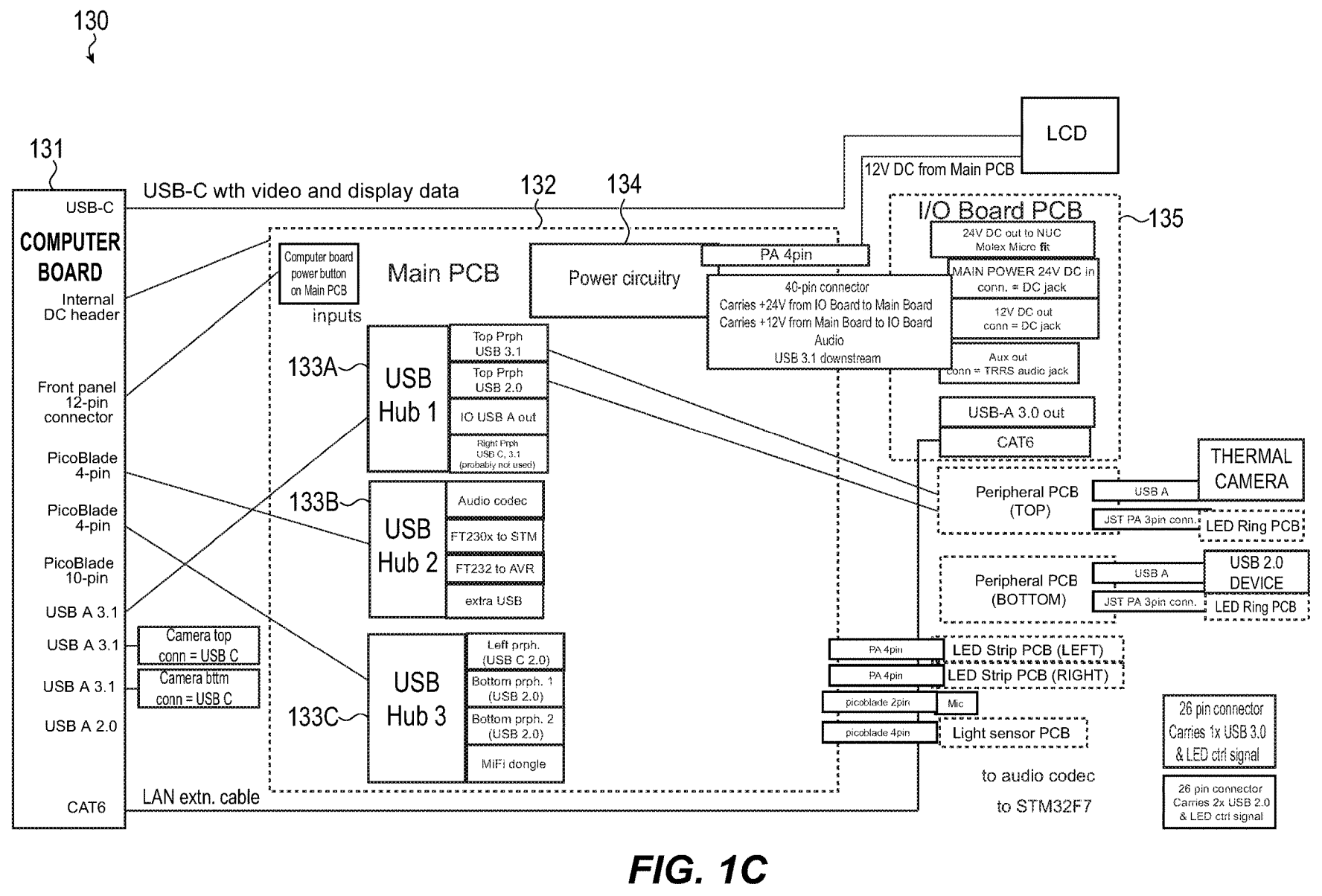

FIG. 1C illustrates example circuitry that may be included in the core unit of FIG. 1A.

FIG. 3A depicts an exploded front view of an example modular biometric station with standalone end caps.

FIG. 3B depicts an exploded back view of the example modular biometric station of FIG. 3A.

FIG. 12A depicts a top view of an additional example core unit with standalone end caps.

FIG. 12B depicts a bottom view of the additional example core unit and standalone end caps of FIG. 12A.

FIG. 12C depicts a front view of the additional example core unit and standalone end caps of FIG. 12A.

FIG. 12D depicts a side view of the additional example core unit and standalone end caps of FIG. 12A.

FIG. 12E depicts a back view of the additional example core unit and standalone end caps of FIG. 12A.

FIG. 12F depicts a front isometric view of the additional example core unit and standalone end caps of FIG. 12A.

FIG. 12G depicts a back isometric view of the additional example core unit and standalone end caps of FIG. 12A.

FIG. 13A depicts a back isometric view of an additional example core unit with standalone end caps.

FIG. 13B depicts a front isometric view of the additional example core unit and standalone end caps of FIG. 13A from the first orientation.

FIG. 13C depicts a top view of the additional example core unit and standalone end caps of FIG. 13A.

FIG. 13D depicts a bottom view of the additional example core unit and standalone end caps of FIG. 13A.

FIG. 13E depicts a side view of the additional example core unit and standalone end caps of FIG. 13A.

FIG. 13F depicts a front view of the additional example core unit and standalone end caps of FIG. 13A.

FIG. 13G depicts a back view of the additional example core unit and standalone end caps of FIG. 13A.

FIG. 13H depicts a back isometric view of the additional example core unit and standalone end caps of FIG. 13A from a second orientation.

FIG. 13I depicts a front isometric view of the additional example core unit and standalone end caps of FIG. 13A from a second orientation.

FIG. 14A depicts a top view of an additional example modular biometric station with a standalone end cap and a module end cap coupled to a module having a fingerprint reader.

FIG. 14B depicts a bottom view of the additional example modular biometric station of FIG. 14A.

FIG. 14C depicts a front view of the additional example modular biometric station of FIG. 14A.

FIG. 14D depicts a side view of the additional example modular biometric station of FIG. 14A.

FIG. 14E depicts a back view of the additional example modular biometric station of FIG. 14A.

FIG. 14F depicts a front isometric view of the additional example modular biometric station of FIG. 14A.

FIG. 14G depicts a back isometric view of the additional example modular biometric station of FIG. 14A.

FIG. 16A depicts a top view of an additional example modular biometric station with a standalone end cap and a module end cap coupled to a module having a barcode reader.

FIG. 16B depicts a bottom view of the additional example modular biometric station of FIG. 16A.

FIG. 16C depicts a front view of the additional example modular biometric station of FIG. 16A.

FIG. 16D depicts a side view of the additional example modular biometric station of FIG. 16A.

FIG. 16E depicts a back view of the additional example modular biometric station of FIG. 16A.

FIG. 16F depicts a front isometric view of the additional example modular biometric station of FIG. 16A.

FIG. 16G depicts a back isometric view of the additional example modular biometric station of FIG. 16A.

FIG. 19A depicts a back isometric view of an additional example modular biometric station with a standalone end cap and a module end cap coupled to a module having a fingerprint reader and a barcode reader from a first orientation.

FIG. 19B depicts a front isometric view of the additional example modular biometric station of FIG. 19A from the first orientation.

FIG. 19C depicts a top view of the additional example modular biometric station of FIG. 19A.

FIG. 19D depicts a bottom view of the additional example modular biometric station of FIG. 19A.

FIG. 19E depicts a side view of the additional example modular biometric station of FIG. 19A.

FIG. 19F depicts a front view of the additional example modular biometric station of FIG. 19A.

FIG. 19G depicts a back view of the additional example modular biometric station of FIG. 19A.

FIG. 19H depicts a back isometric view of the additional example modular biometric station of FIG. 19A from a second orientation.

FIG. 19I depicts a front isometric view of the additional example modular biometric station of FIG. 19A from a second orientation.

FIG. 22U depicts a front view of the modular biometric station of FIG. 22Q with the module end cap and the third module removed.

FIG. 22V depicts a front view of the modular biometric station of FIG. 22A with one of the standalone end caps replaced with a module end cap and a fourth module.

FIG. 22W depicts a front view of the modular biometric station of FIG. 22A with the module end cap and the fourth module removed.

FIG. 22X depicts a back view of the modular biometric station of FIG. 22A with the module end cap and the fourth module removed.

FIG. 22Y depicts an isometric view of one of the standalone end caps of FIG. 22A in isolation.

FIG. 22Z depicts a back isometric view of the modular biometric station of FIG. 22A from a second orientation without one of the end caps.

DETAILED DESCRIPTION

Figure 1A:
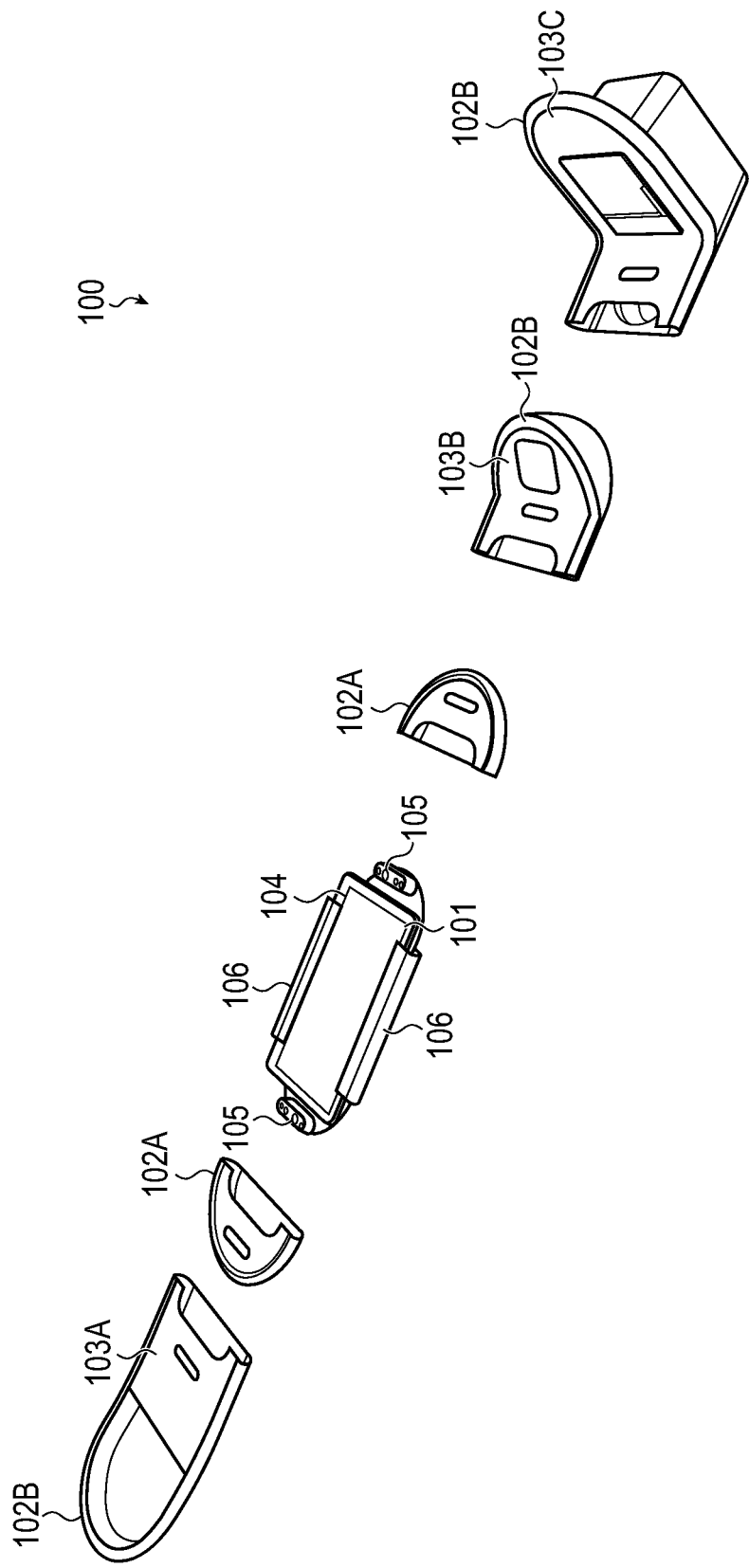
FIG. 1A depicts an example modular biometric station system that may be used to form one or more modular biometric stations with cohesive form factors.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, apparatuses, methods, and computer program products that embody various elements of the present disclosure. However, it should be understood that the described disclosure may be practiced in a variety of forms in addition to those described herein.

A biometric station may be any device that may be used to interact with a biometric identification system. Such a biometric station may include one or more components, such as one or more biometric reader devices for obtaining digital representations of one or more biometrics. Other components may include one or more displays and/or other user input and/or output components, communication components for communicating with one or more back end devices and/or other devices, and so on.

Different applications for biometric stations may involve different components. As such, different biometric stations may be designed and constructed to suit the parameters of different applications. This may be expensive and inefficient. One alternative to designing and constructing the full variety of biometric stations used by all the various applications may be to design and construct fewer different biometric stations and use biometric stations that do not include components desired for a particular application and to instead do without and/or to redesign the particular application. However, this could result in an impaired application. Another alternative would be to design and construct a biometric station with components that will not be used by the particular application to which the biometric station will be put. However, this may render the biometric station more expensive and complicated than necessary for the particular application and/or may result in errors and/or maintenance related to components that are not even used.

Still another option would be to design and construct a base portion of a biometric station that includes expansion ports via which various components may be connected. However, such an approach may result in a haphazard arrangement of cables and various form factor components that may not even be configured to couple together, presuming the components and/or the base portion are even able to interact with each other at all.

The present disclosure relates to a modular biometric station system that may be used to form one or more modular biometric stations with cohesive form factors. The modular biometric station system may be used to form one or more biometric stations that include a core unit, one or more end caps, and one or more modules. The modules may be configured to communicably and electrically couple to one or more of the end caps. The end caps may be configured to communicably and electrically couple to the core unit and/or one or more of the modules and may communicably and electrically couple one or more of the modules to the core unit. The core unit, the end caps, and/or the modules may be able to communicably interact when coupled together. The core unit, end caps, and modules may all share a form factor. The core unit may include hardware and/or software that satisfies common requirements and the modules may include peripherals and/or other components that can be coupled to the core unit to adapt the modular biometric station to a variety of different needs of different applications. In this way, a single biometric station may be designed and used, whether or not with any of the modules and/or multiple modules, for all of the various applications for which the biometric station is to be used.

This modular biometric station system allows performance of functions that were previously not performable and enables more efficiency while expending less work, eliminating unnecessary hardware and/or other components, and more efficiently using hardware, software, network, and/or other resources. This may improve the operation of systems involved by reducing unnecessary components, increasing the speed at which the systems perform operations, and/or reducing consumption of hardware, software, network, and/or other resources.

These and other embodiments are discussed below with reference to FIGS. 1A-22Z. However, those skilled in the art will readily appreciate that the detailed description given herein with respect to these Figures is for explanatory purposes only and should not be construed as limiting.

FIG. 1A depicts an example modular biometric station system 100 that may be used to form one or more modular biometric stations with cohesive form factors. The modular biometric station system 100 may include a core unit 101, one or more standalone end caps 102A, one or more module end caps 102B, and one or more modules 103A, 103B, 103C. The standalone end caps 102A may be standalone end caps 102A as opposed to module end caps 102B because the standalone end caps 102A are not configured to couple a module 103A, 103B, 103C to the core unit 101. Conversely, the module end caps 102B may be module end caps 102B as opposed to standalone end caps 102A because the module end caps 102B are configured to couple one or more modules 103A, 103B, 103C to the core unit 101. One or more of the core unit 101, the standalone end caps 102A, the module end caps 102B, and/or the modules 103A, 103B, 103C may be coupled together to form one or more modular biometric stations with cohesive form factors. Examples of such are shown in FIGS. 4, 5, 6, 7A-7B, 12A-12G, 13A-13I, 14A-14G, 15A-15I, 16A-16G, 17A-17I, 18A-18G, and 19A-19I.

Figure 1B:
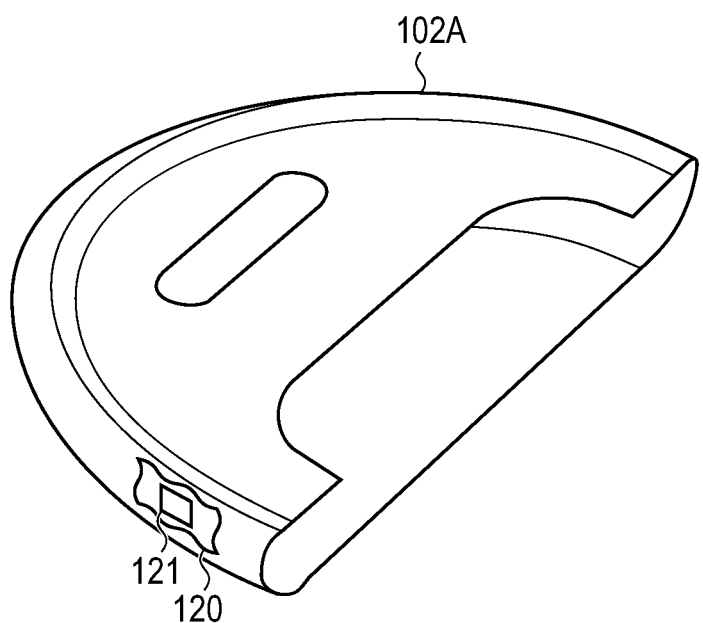
FIG. 1B depicts an example standalone end cap illustrating a cut away exposing one or more light emitting diodes embedded therein.

The standalone end caps 102A and/or the module end caps 102B (and/or one or more of the standalone end caps 302A, 1202A, 1302A, 1402A, 1502A, 1602A, 1702A, 1802A, 1902A, 2002A, 2102A, 2202A of FIGS. 3A-5, 12A-14A, 14C-14G, 15A-15B, 15D-16A, 16C-17C, 17G-18A, 18C-19B, 19D-22M, 22O-22R, and 22U-22X and/or one or more of the module end caps 302B, 1202B, 1302B, 1402B, 1502B, 1602B, 1702B, 1802B, 1902B, 2002B, 2102B, 2202B of FIGS. 5-6, 14B-14G, 15C, 15E-15I, 16B-17B, 17D-17I, 18B-19C, 19E-21B, and 22I-22Z) may include one or more various different components. For example, the standalone end caps 102A and/or the module end caps 102B (and/or one or more of the standalone end caps 302A, 1202A, 1302A, 1402A, 1502A, 1602A, 1702A, 1802A, 1902A, 2002A, 2102A, 2202A of FIGS. 3A-5, 12A-14A, 14C-14G, 15A-15B, 15D-16A, 16C-17C, 17G-18A, 18C-19B, 19D-22M, 22O-22R, and 22U-22X and/or one or more of the module end caps 302B, 1202B, 1302B, 1402B, 1502B, 1602B, 1702B, 1802B, 1902B, 2002B, 2102B, 2202B of FIGS. 5-6, 14B-14G, 15C, 15E-15I, 16B-17B, 17D-17I, 18B-19C, 19E-21B, and 22I-22Z) may include one or more LEDs (light emitting diodes) and/or other lighting components embedded therein. FIG. 1B depicts an example standalone end cap 102A illustrating a cut away 120 exposing one or more LEDs 121 embedded therein. In such an example, the standalone end cap 102A may be entirely and/or partially formed of one or more materials (such as plastic, glass, and so on) that may enable illumination from the one or more LEDs 121 to travel to an external environment despite the one or more LEDs 121 being embedded within the standalone end cap 102A.

Although FIG. 1B depicts the one or more LEDs 121 embedded within the standalone end cap 102A, it is understood that this is an example. In other implementations the one or more LEDs 121 may be disposed on one or more surfaces of the standalone end cap 102A, may be embedded within and/or disposed on one or more module end caps, and so on. Further, in various embodiments, components other than the one or more LEDs 121 may be embedded within the standalone end cap 102A, disposed on one or more surfaces of the standalone end cap 102A, embedded within and/or disposed on one or more module end caps, and so on. Various configurations are possible and contemplated without departing from the scope of the present disclosure.

Returning to FIG. 1A, the standalone end caps 102A and the module end caps 102B may be configured to communicably and electrically couple to the core unit 101. The standalone end caps 102A and the module end caps 102B may include one or more ports and/or other connectors (such as one or more Universal Serial Bus or "USB" ports or connectors, like USB 2.0 5 volt ports or connectors, USB 3.0 5 volt ports or connectors, USB C ports or connectors, and so on) that are operable to couple to one or more ports and/or other connectors (such as one or more Universal Serial Bus or "USB" ports or connectors, like USB 2.0 5 volt ports or connectors, USB 3.0 5 volt ports or connectors, USB C ports or connectors, and so on) of the core unit 101 in order to exchange data and/or power therebetween. For example, the standalone end caps 102A and the module end caps 102B may each include one or more female USB 2.0 5 volt ports or connectors, USB 3.0 5 volt ports or connectors, USB C ports or connectors, and so on that are operable to mate with one or more male USB 2.0 5 volt ports or connectors, USB 3.0 5 volt ports or connectors, USB C ports or connectors, and so on of the core unit 101. By way of another example, the standalone end caps 102A and the module end caps 102B may each include one or more male USB 2.0 5 volt ports or connectors, USB 3.0 5 volt ports or connectors, USB C ports or connectors, and so on that are operable to mate with one or more female USB 2.0 5 volt ports or connectors, USB 3.0 5 volt ports or connectors, USB C ports or connectors, and so on of the core unit 101. Various configurations are possible and contemplated without departing from the scope of the present disclosure. The standalone end caps 102A may be configured to couple to the core unit 101 without any modules 103A, 103B, 103C.

The module end caps 102B may be configured to communicably and electrically couple to one or more of the modules 103A, 103B, 103C, thus communicably and electrically coupling the modules 103A, 103B, 103C to the core unit 101 when the module end caps 102B are coupled to the modules 103A, 103B, 103C and the core unit 101. The module end caps 102B may include one or more ports and/or other connectors (such as one or more Universal Serial Bus or "USB" ports or connectors, like USB 2.0 5 volt ports or connectors, USB 3.0 5 volt ports or connectors, USB C ports or connectors, and so on) that are operable to couple to one or more ports and/or other connectors (such as one or more Universal Serial Bus or "USB" ports or connectors, like USB 2.0 5 volt ports or connectors, USB 3.0 5 volt ports or connectors, USB C ports or connectors, and so on) of the modules 103A, 103B, 103C in order to exchange data and/or power therebetween. By way of example, the modules 103A, 103B, 103C may include one or more female USB 2.0 5 volt ports or connectors, USB 3.0 5 volt ports or connectors, USB C ports or connectors, and so on that are operable to mate with one or more male USB 2.0 5 volt ports or connectors, USB 3.0 5 volt ports or connectors, USB C ports or connectors, and so on of the module end caps 102B. By way of another example, the modules 103A, 103B, 103C may include one or more male USB 2.0 5 volt ports or connectors, USB 3.0 5 volt ports or connectors, USB C ports or connectors, and so on that are operable to mate with one or more female USB 2.0 5 volt ports or connectors, USB 3.0 5 volt ports or connectors, USB C ports or connectors, and so on of the module end caps 102B. Various configurations are possible and contemplated without departing from the scope of the present disclosure.

The core unit 101, the standalone end caps 102A, the module end caps 102B, and/or the modules 103A, 103B, 103C may be able to communicably interact when coupled together. This may include exchanging data, power, and so on.

The core unit 101 may include one or more top (left with respect to FIG. 1A) ports or connectors, bottom (right with respect to FIG. 1A) ports or connectors, left (front with respect to FIG. 1A) side ports or connectors, and right (back with respect to FIG. 1A) side ports or connectors. In some embodiments, the ports or connectors of the core unit 101 may all be uniform, such as embodiments where the ports or connectors of the core unit 101 are all USB 2.0 5 volt ports or connectors or USB 3.0 5 volt ports or connectors. In other embodiments, the ports or connectors of the core unit 101 may be different, such as embodiments where the top and bottom ports or connectors of the core unit 101 are all USB 2.0 5 volt ports or connectors or USB 3.0 5 volt ports or connectors and the left and right ports are USB C ports or connectors. Various configurations are possible and contemplated without departing from the scope of the present disclosure.

The core unit 101 may include circuitry that is operable to detect one or more coupled modules 103A, 103B, 103C, standalone end caps 102A, and/or module end caps 102B and/or different power requirements of one or more modules 103A, 103B, 103C, standalone end caps 102A, and/or module end caps 102B coupled via one or more of the ports or connectors. The circuitry may provide power according to the detected requirements. For example, the circuitry may include one or more circuit boards with one or more USB hubs and one or more ports or connectors and/or interfaces to such ports or connectors that are operable to communicably and/or electrically couple to one or more ports or connectors of one or more standalone end caps 102A and/or module end caps 102B (and/or one or more components of the core unit 101). The circuitry may further include one or more computer boards to which the one or more USB hubs are communicably and/or electrically connected. The circuitry may additionally include one or more input and/or output components that are communicably and/or electrically connected to the one or more circuit boards.

For example, FIG. 1C illustrates example circuitry 130 that may be included in the core unit 101 of FIG. 1A (and/or one or more of the core units 201, 301, 1001, 1101, 1201, 1301, 1401, 1501, 1601, 1701, 1801, 1901, 2001, 2101, 2201 of FIGS. 2-6 and 10A-16A, 16C-18B, 18D-22X and 22Z and/or one or more of the other components illustrated and described with respect to FIGS. 1A-22Z). The circuitry 130 may include one or more main printed circuit boards 132 with one or more USB hubs 133A, 133B, 133C and one or more ports or connectors and/or interfaces to such ports or connectors that are operable to communicably and/or electrically couple to one or more ports or connectors of one or more standalone end caps and/or module end caps (and/or one or more components of a core unit). The circuitry may further include one or more computer boards 131 to which the one or more USB hubs 133A, 133B, 133C are communicably and/or electrically connected. The USB hubs 133A, 133B, 133C may extend USB provided by the computer board 131. In this way, with reference to FIGS. 1A-1C, the USB provided by the computer board (whether or not via the USB hubs 133A, 133B, 133C) may be used to exchange power and/or data with and/or between one or more components, such as one or more components of the core unit 101 (such as the display 104, the cameras 105, the lighting components 106, the LED 121, and so on), the standalone end caps 102A, the module end caps 102B, and/or one or more of the modules 102A, 103A, 103B, 103C. The USB of this configuration may be operable to detect one or more coupled modules 103A, 103B, 103C, standalone end caps 102A, and/or module end caps 102B and/or different power requirements of one or more modules 103A, 103B, 103C, standalone end caps 102A, and/or module end caps 102B. The circuitry 130 may additionally include power circuitry 134 and/or one or more input and/or output components that are communicably and/or electrically connected to the one or more circuit boards, such as one or more IO board printed circuit boards 135.

FIG. 1C illustrates a particular example circuitry 130. However, it is understood that this is an example and that one or more components thereof may be changed without departing from the scope of the present disclosure.

For example, the example circuitry 130 is illustrated as including a liquid crystal display or "LCD." However, it is understood that this is an example. In various implementations, the LCD may be replaced with another kind of display. Various configurations are possible and contemplated without departing from the scope of the present disclosure.

Returning to FIG. 1A, the core unit 101, standalone end caps 102A, module end caps 102B, and modules 103A, 103B, 103C may all share a form factor (i.e., a hardware design aspect that defines and prescribes the size, shape, and other physical specifications of components, particularly in electronics), or cooperate to define a form factor. The core unit 101 may include hardware and/or software that satisfies common requirements and the modules 103A, 103B, 103C may include peripherals and/or other components that can be coupled to the core unit 101 via one or more module end caps 102B to form a modular biometric station according to a variety of different needs of different applications. In this way, a single modular biometric station system 100 may be designed and used, whether or not with any of the modules 103A, 103B, 103C and/or multiple modules 103, for all of the various applications for which the modular biometric station system 100 is to be used. Thus, the core unit 101, standalone end caps 102A, module end caps 102B, and modules 103A, 103B, 103C all sharing a form factor, or cooperating to define a form factor, may involve the core unit 101, standalone end caps 102A, module end caps 102B, and modules 103A, 103B, 103C all conforming to a hardware design aspect that defines and prescribes the size, shape, and/or other physical specifications.

This modular biometric station system 100 may allow performance of functions that were previously not performable, or combined together, and enables more efficiency of such functions while expending less work, eliminating unnecessary hardware and/or other components, and more efficiently using hardware, software, network, and/or other resources. This may improve the operation of systems involved by reducing unnecessary components, increasing the speed at which the systems perform operations, and/or reducing consumption of hardware, software, network, and/or other resources.

By way of illustration, the module 103A may include a thermal imaging component, the module 103B may include barcode reader, and the module 103C may include a fingerprint reader. However, it is understood that this is an example. In various implementations, the modules 103A, 103B, and 103C and/or other modules 103A, 103B, and 103C may include one or more iris reader components, one or more communication components (such as one or more Bluetooth™ communication components, WiFi communication components, one or more cellular communication components, one or more near-field communication components, one or more ultrawideband communication components, one or more components that are operable to detect one or more communication modules of another device, and so on) one or more lighting modulation components, one or more components that modulate light per ambient lighting, one or more components that modulate light in response to glasses and/or glasses detection and/or glare and/or glare detection, one or more document scanner components, one or more credit card reader and/or other payment components (which may and/or may not integrate with one or more other components and/or modules 103A, 103B, 103C other than the module 103A, 103B, 103C of which it is a component), one or more continuous lighting modules, one or more FPR (flat plate reflector) optimized angle components, one or more drainage components, one or more uplighting benefit components, and so on.

In this example, the modular biometric station system 100 may be used to form a facial verification kiosk with a cohesive form factor. However, it is understood that this is an example. In other implementations, the modular biometric station system 100 may be used to form a modular biometric station other than a facial verification kiosk; as non-limiting examples, such a modular biometric station may capture, verify, and/or employ biometrics such as fingerprints, retinal scans, gait tracking, finger lengths and ratios, blood vessel patterns, voice or speech, and so on. In still other implementations, such a modular biometric station may incorporate additional functionality beyond biometric capture and/or verification, such as health testing (including antibody testing, infection testing, temperature monitoring, and the like), providing access to various records for a verified entity, tracking movement of a person within an environment containing such a modular biometric station, and so on. Various configurations are possible and contemplated without departing from the scope of the present disclosure.

The modular biometric station system 100 may be used to form modular biometric stations that are usable for a variety of different applications. Examples of such different applications include government, travel, healthcare, retail, and more. Each application may have different requirements for biometric identification, verification, authorization, and so on. This may include different types and/or combinations of hardware to meet individual application needs. While each application's needs are different, they may all share a common set of hardware requirements. In this example, this may include one or more displays 104, one or more camera(s) 105 (such as one or more two-dimensional cameras and/or other image sensors, three-dimensional cameras and/or other image sensors that may be used to obtain infrared images, determine one or more distances to one or more people and/or other subjects and/or other depth sensing, and so on), one or more central processing units ("CPU") (not shown) and/or other processing units and/or controllers, one or more sets of circuitry (not shown), one or more lighting components 106 (such as one or more LEDs, one or more ambient light sensors positioned on the back of the core unit 101, which may protect the ambient light sensors from interference from the forward facing lighting components 106 and/or other lighting components not facing the back of the core unit 101, and/or otherwise positioned that may be used to perform functions such as detecting ambient light for controlling the one or more LEDs in order to adjust the ambient lighting for facial image capture, and so on), and so on. As such, this present disclosure may provide a modular biometric station system 100 based on a core unit 101 that can satisfy common requirements, and attachable peripherals that may enable the system to adapt to a variety of application needs.

As shown, the lighting components 106 may be disposed at different positions than the cameras 105. Disposing the lighting components 106 at different positions than the cameras 105 (such as positioning other lighting components 106 in and/or on one or more standalone end caps 102A, module end caps 102B, and/or modules 103A, 103B, 103C) may prevent the lighting components 106 from interfering with the cameras 105.

In this example modular biometric station system 100 may be based on a core unit 101 that includes the common hardware (or some common hardware) required across all applications for which the modular biometric station system 100 is to be used. The core hardware set may include, but may not be limited to, one or more touch and/or other displays 104, one or more cameras 105, one or more processing units, lighting components 106, one or more speakers, one or more microphones, and so on. The core unit 101 may be designed in such a way to accept modules 103 and/or end caps 102 at the top and/or the bottom to enable a modular biometric station formed from the modular biometric station system 100 to be one cohesive unit no matter which peripheral set is chosen. For example, the core unit 101 may include one more ports at the top and the bottom that allow the one or more modules 103 to be communicably connected. The one or more end caps 102 may cover the one or more ports when coupled to the core unit 101. The exploded view in FIG. 1A shows how the variety of modules 103 may be attached to the core unit 101.

Alternatively, in some embodiments, the modules 103A, 103B, 103C may couple to the core unit 101 and/or each other instead of the module end caps 102B as described above. Various configurations are possible and contemplated without departing from the scope of the present disclosure.

Additionally, although the above illustrates and describes standalone end caps 102A and module end caps 102B, it is understood that this is an example. In various implementations, a single end cap may be used that is configured to couple to the core unit 101 with or without any modules 103A, 103B, 103C. Various configurations are possible and contemplated without departing from the scope of the present disclosure.

Further, the above illustrates the module end caps 102B being used with a number of modules 103A, 103B, 103C. However, it is understood that this is an example. In various implementations, multiple differently configured module end caps 102B may be configured to be used that may be usable with only one type of module 103A, 103B, 103C (such as where a module end cap 102B is physically configured to mate with only one type of module 103A, 103B, 103C), may be configured to be used with some but not all of the modules 103A, 103B, 103C (such as where a module end cap 102B is physically configured to mate with some but not all types of module 103A, 103B, 103C), and so on. Various configurations are possible and contemplated without departing from the scope of the present disclosure.

In some implementations, one or more of the core unit 101, the standalone end caps 102A, the module end caps 102B, and/or one or more of the modules 103A, 103B, 103C may include one or more communication components (such as one or more Bluetooth™ communication components, WiFi communication components, one or more cellular communication components, one or more near-field communication components, one or more ultrawideband communication components, one or more components that are operable to detect one or more communication modules of another device, and so on). Such communication components may be used to detect the proximity of one or more communication modules of another device (such as a smart phone, a tablet computing device, a mobile computing device, and so on) that is associated with one or more identities. In response to such a detection, one or more digital representations of biometrics and/or associated identity data may be loaded into a local gallery of an associated modular biometric station and/or associated storage device from a main gallery (such as a main gallery of a remote identity system that stores one or more digital representations of biometrics for a number of people associated with identity information for those people). The one or more digital representation of biometrics and/or associated identity data in the local gallery may then be used to perform one or more biometric identifications, improving accuracy and/or response time of the biometric identification compared to using the main gallery. Various configurations are possible and contemplated without departing from the scope of the present disclosure.

Although the above illustrates and describes the standalone end caps 102A communicably and electrically connecting to the core unit 101, it is understood that this is an example. In various implementations, the standalone end caps 102A may couple to the core unit 101 without any communication and/or electrical connections. Various configurations are possible and contemplated without departing from the scope of the present disclosure.

Although the above illustrates and describes the module end caps 102B communicably and electrically connecting to the core unit 101 and the modules 103A, 103B, 103C communicably and electrically connecting to the core unit 101 via the module end caps 102B, it is understood that this is an example. In various implementations, one or more modules 103A, 103B, 103C may directly communicably and electrically connect to the core unit 101 and one or more module end caps 102B and/or other components may couple to the one or more modules 103A, 103B, 103C. In any number of implementations, module end caps 102B and/or standalone enc caps 102A may be omitted. Various configurations are possible and contemplated without departing from the scope of the present disclosure.

Figure 2:
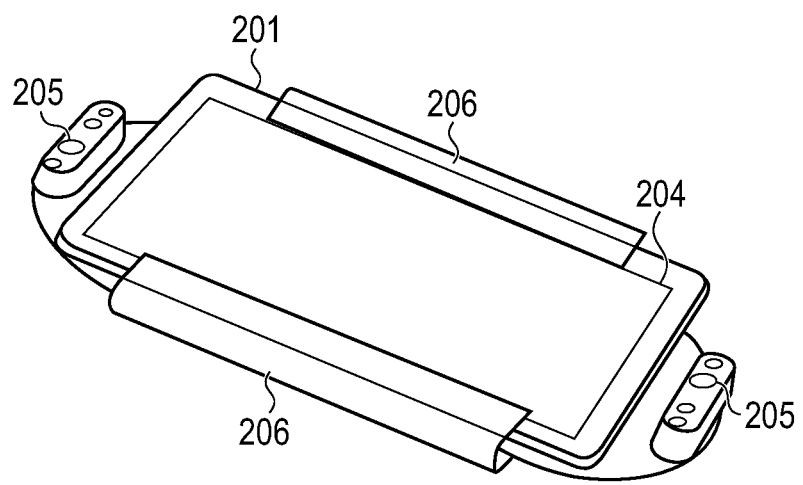
FIG. 2 depicts a first example core unit that may be used in the example modular biometric station system of FIG. 1A.

FIG. 2 depicts a first example core unit 201 that may be used in the example modular biometric station system 100 of FIG. 1. In this example, the core unit 201 may contain two cameras 205. For example, the core unit 201 may include a top camera 205 and a bottom camera 205. In various examples, the top camera 205 and bottom camera 205 may each be able to resolve >100 pixels on a face at 40 inches and/or support a field of view of subjects between 30 inches and 70 inches, although these are example distances and may vary with different embodiments. In a number of examples, the top camera 205 and bottom camera 205 may be one or more two-dimensional cameras and/or other image sensors, three-dimensional cameras and/or other image sensors that may be used to obtain infrared images (which may be less dependent on ambient lighting and/or other lighting conditions than other kinds of images), determine one or more distances to one or more people and/or other subjects and/or other depth sensing (such as determining distance to a person for facial capture, adjusting lighting and/or other environmental parameters for facial capture, and so on), obtain facial and/or other images, and so on. In addition, one or more lighting components 206 (such as one or more individual software-controlled RGBW (red, green, blue, white) and/or other LEDs, an ambient light sensor, and/or other light-related components) may be included in the core unit 201, such as to provide optimal lighting conditions for facial verification. Glasses detection software executable by the core unit 201 and/or a module may be able to alter lighting for people with and without glasses, providing either side lighting, overhead lighting, and so on.

Figure 4:
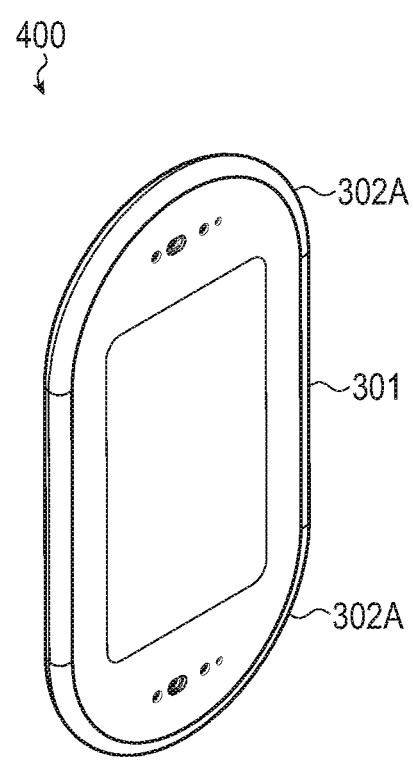
FIG. 4 depicts the second example core unit of FIG. 3A with the standalone end caps attached.

In a basic embodiment, a specific application may be restricted to the core unit 201. In such an example, standalone end caps may be attached to the core unit 201. FIGS. 3A and 3B depict exploded front and back views of a second example core unit 301 that may be used in an example modular biometric station with standalone end caps 302A. FIG. 4 depicts a modular biometric station 400 including the second example core unit 301 of FIGS. 3A-3B with the standalone end caps 302A attached. The standalone end caps 302A may be used to extend lighting (and/or position lighting components at locations other than directly proximate a camera where interference may be possible), for sealing purposes, for protection, to provide cohesion to the forms, and so on. In some embodiments, the standalone end caps 302A may provide data and power exchange between the core unit 301 and any modules rather than being standalone.

In various examples, one or more of the standalone end caps 302A may be non-destructively removed (i.e., removed without damaging the standalone end cap 302A and/or a component coupled thereto such that they may be subsequently reattached without impairing one or more functions) and one or more module end caps may be coupled to the core unit 301 in their place. One or more modules may be coupled to the one or more module end caps. Various configurations are possible and contemplated without departing from the scope of the present disclosure.

Figure 5:
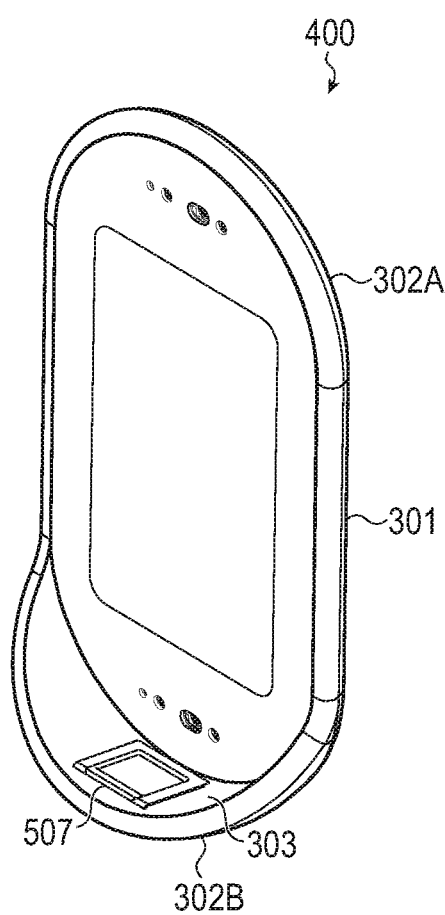
FIG. 5 depicts the example modular biometric station of FIG. 4 with the addition of an example fingerprint module.

With reference to FIG. 5, some applications may make use of a fingerprint reader 507 that may be included in a module 303 that is coupled to a module end cap 302B. For example, applications may use the fingerprint reader 507 as a backup verification modality, as a primary verification modality, and so on. In some such examples, a lower module 303 peripheral with the fingerprint reader 507 and/or fingerprint reader function may be attached to the bottom of the core unit 301 and the end cap 302A may be attached to the top of the core unit. By way of illustration, FIG. 5 depicts the example modular biometric station 400 of FIG. 4 with the addition of an example fingerprint module 303 instead of the lower end cap 302A.

However, it is understood that this is an example. Examples of modules 303 may include one or more barcode modules 303, one or more thermal modules 303 (such as one or more thermal imaging modules 303, thermal imaging sensor modules 303, one or more thermal imaging camera modules 303, and so on), one or more iris reader modules 303, one or more communication modules 303 (such as one or more Bluetooth™ communication modules 303, WiFi communication modules 303, one or more cellular communication modules 303, one or more near-field communication modules 303, one or more ultrawideband communication modules 303, one or more modules 303 that are operable to detect one or more communication modules of another device, and so on) one or more lighting modulation modules 303, one or more modules 303 that modulate light per ambient lighting; one or more modules 303 that modulate light in response to glasses and/or glasses detection and/or glare and/or glare detection; one or more document scanner modules 303, one or more credit card reader and/or other payment modules 303 (which may and/or may not integrate with one or more other modules 303); one or more barcode reader modules 303, one or more contiguous lighting modules 303, one or more FPR optimized angle modules 303, one or more drainage modules 303, one or more uplighting benefit modules 303, and so on. Various configurations are possible and contemplated without departing from the scope of the present disclosure.

In various examples, the standalone end cap 302A may be non-destructively removed and a module end cap 302B may be coupled to the core unit 301 in its place. One or more modules 303 may be coupled to the module end cap 302B. Similarly, in various examples, the module end cap 302B and/or the module 303 may be non-destructively removed (i.e., removed without damaging the module end cap 302B, the module 303, and/or a component coupled thereto such that they may be subsequently reattached without impairing one or more functions) and a standalone end cap 302A may be coupled to the core unit 301 in their place. Various configurations are possible and contemplated without departing from the scope of the present disclosure.

Returning to FIG. 1A, to effectively verify an individual's identity through facial recognition, the scanning environment may attempt to provide adequate illumination of the face. This may not always be possible to achieve through the variety of lighting environments across the many use cases of this technology. For example, outdoor venue access at night may involve placing the modular biometric station in a dark environment. Even when inside, lighting from behind a person (artificial or sunlight through windows) may make it difficult for the camera and/or other image sensor to adjust exposure to the person's face, which may be less illuminated.

Due to these challenges, incorporating onboard lighting may enable the device to compensate for ambient lighting by adequately illuminating a person's face. Because lighting may differ across environments, an onboard ambient light sensor may enable the system to compensate through the modulation of onboard lighting.

For people with glasses and/or similar devices, onboard lighting may reflect from the lens. This may result in a glare on the image, which may prevent the facial recognition software from effectively capturing the area around the eyes. This may make it difficult or impossible to identify the person. For this reason, the modular biometric station may recognize glare and modulate lighting to eliminate and/or mitigate this.

Figure 6:
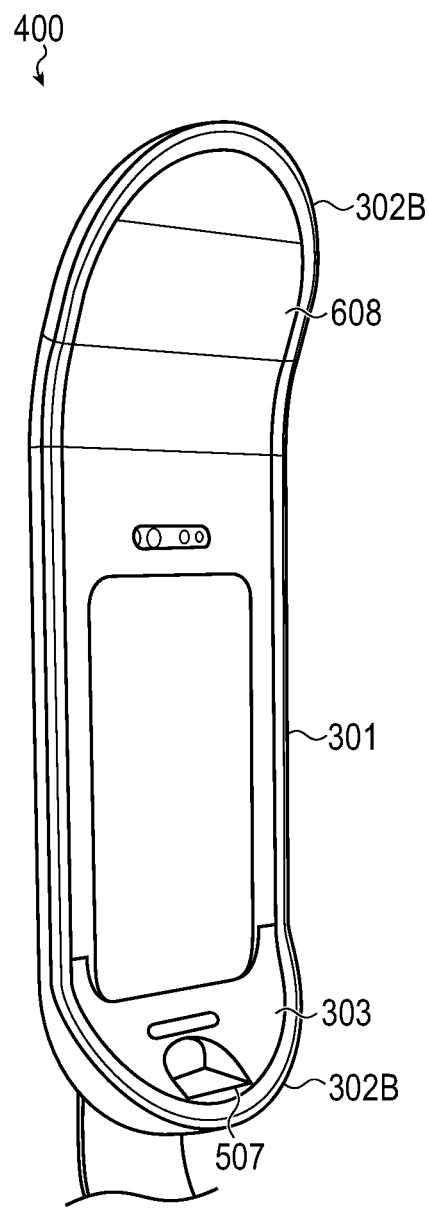
FIG. 6 depicts the example modular biometric station of FIG. 4 with the addition of an example lighting module.

Another mechanism and/or procedure to reduce glasses glare and/or similar issues may be to use a light module that extends outward from the camera and/or other image sensor to a distance and angle that may effectively eliminate reflection from users' glasses. For example, FIG. 6 depicts the example modular biometric station 400 of FIG. 4 with the addition of an example lighting module 608 and module end cap 302B.

In various examples, the module end cap 302B and/or the lighting module 608 may be non-destructively removed and a standalone end cap 302A may be coupled to the core unit 301 in their place. Various configurations are possible and contemplated without departing from the scope of the present disclosure.

Figure 7A:
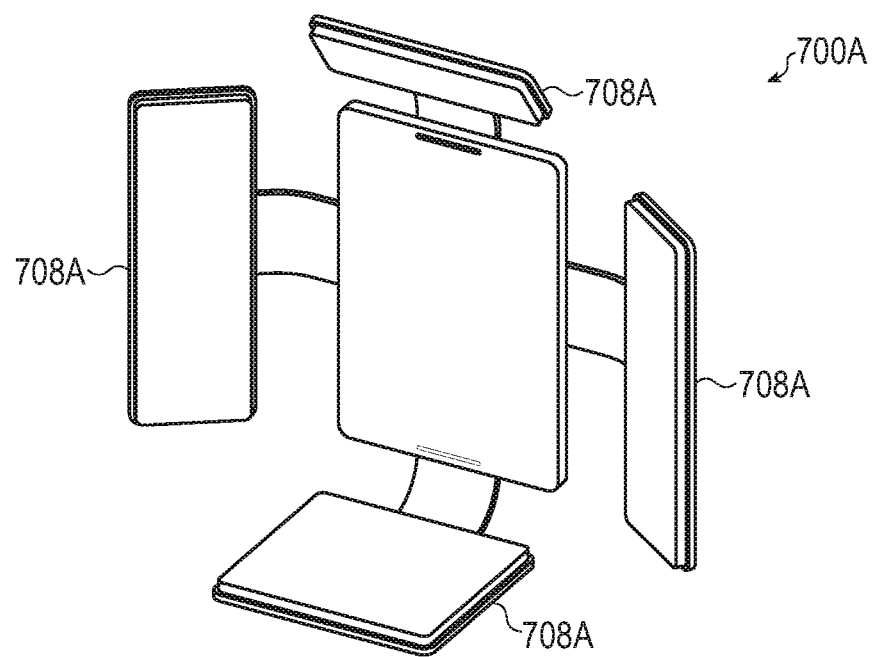
FIG. 7A depicts a first alternative embodiment of the example modular biometric station of FIG. 4 with a first alternative example lighting module.
Figure 7B:
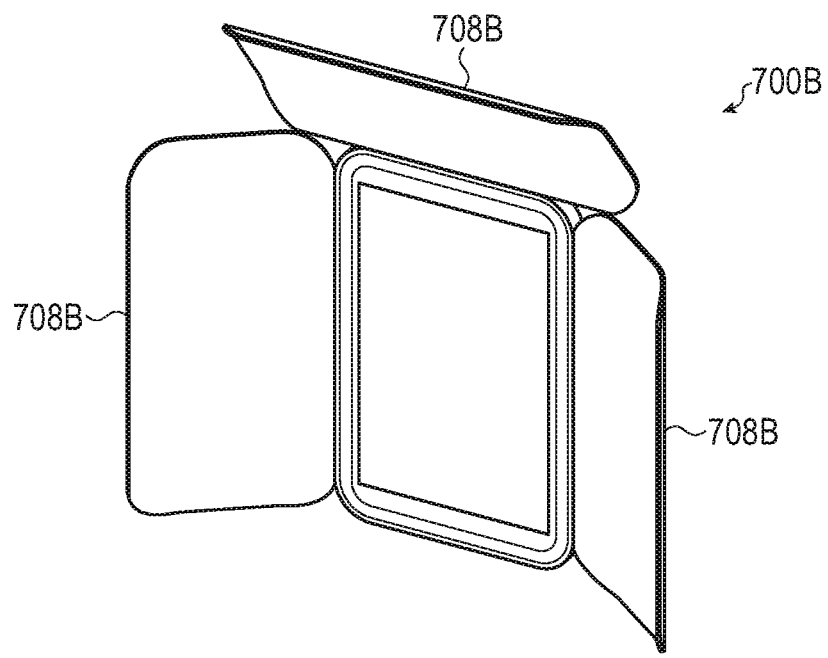
FIG. 7B depicts a second alternative embodiment of the example modular biometric station of FIG. 4 with a second alternative example lighting module.

FIGS. 7A and 7B depict alternative embodiments 700A, 700B of the example modular biometric station 400 of FIG. 4. These alternative embodiments 700A, 700B of the example modular biometric station 400 of FIG. 4 include an alternative example lighting module 708A, 708B.

In various examples, one or more of the lighting modules 708A, 708B may be non-destructively removed and a standalone end cap 302A may be coupled in their place. Various configurations are possible and contemplated without departing from the scope of the present disclosure.

Figure 8A:
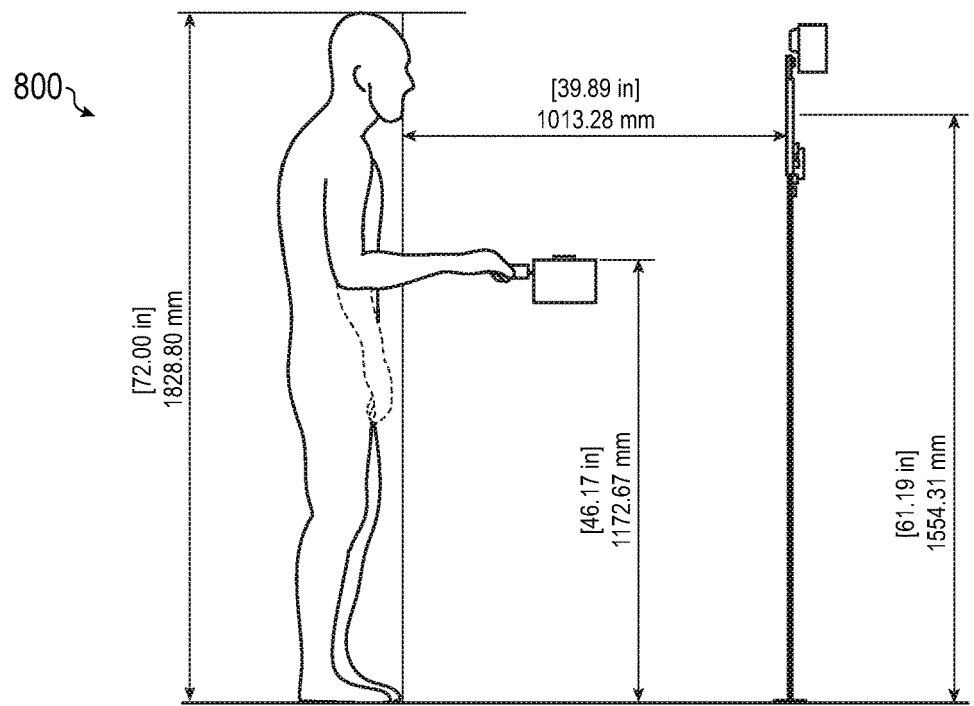
FIG. 8A depicts a side view of an example horizontal distance arrangement that may be used with a lighting module to avoid glasses glare and/or other lighting issues. This example horizontal distance arrangement may be used with the lighting modules of FIGS. 6 and/or 7A-7B.
Figure 8B:
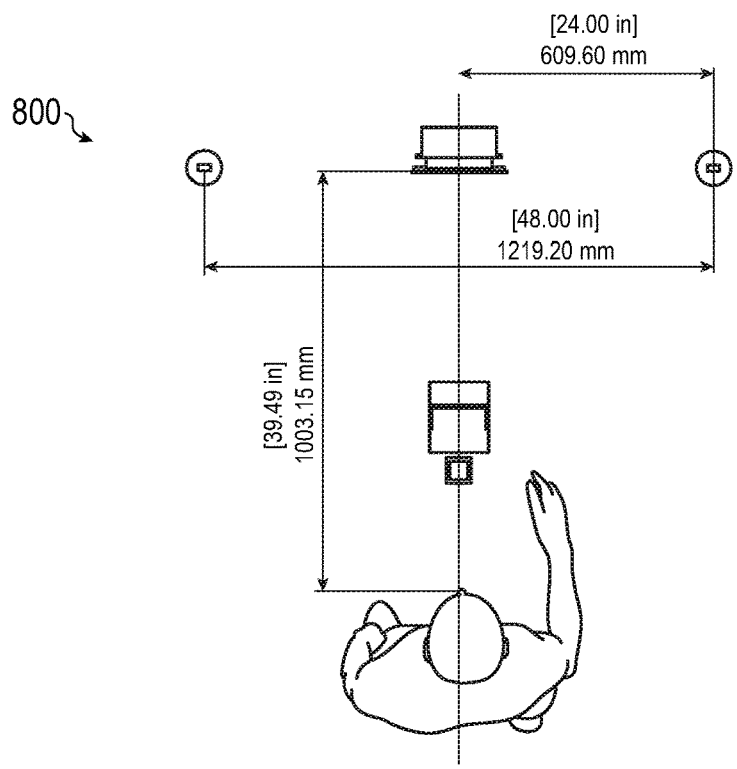
FIG. 8B depicts a top view of the example horizontal distance arrangement of FIG. 8A.

FIGS. 8A and 8B depict side and top views of an example horizontal distance arrangement 800 that may be used with a lighting module to avoid glasses glare and/or other lighting issues. This example horizontal distance arrangement 800 may be used with the lighting modules of FIGS. 6 and/or 7A-B. Although FIGS. 8A-8B illustrate example horizontal distance arrangements 800, it is understood that this is an example. In some implementations, a vertical distance arrangement may be used. Various configurations are possible and contemplated without departing from the scope of the present disclosure.

With reference again to FIG. 1A, although particular modules and/or components of the core unit 101 are illustrated and discussed above, it is understood that these are examples. Other configurations are possible and contemplated without departing from the scope of the present disclosure. By way of illustration, other examples of modules 103A, 103B, 103C may include one or more barcode modules 103A, 103B, 103C; one or more thermal modules 103A, 103B, 103C (such as one or more thermal imaging modules 103A, 103B, 103C; thermal imaging sensor modules 103A, 103B, 103C; one or more thermal imaging camera modules 103A, 103B, 103C; and so on), one or more iris reader modules 103A, 103B, 103C; one or more communication modules 103A, 103B, 103C (such as one or more Bluetooth™ communication modules 103A, 103B, 103C; WiFi communication modules 103A, 103B, 103C; one or more cellular communication modules 103A, 103B, 103C; one or more near-field communication modules 103A, 103B, 103C; one or more ultrawideband communication modules 103A, 103B, 103C; one or more modules 103A, 103B, 103C that are operable to detect one or more communication modules of another device, and so on) one or more lighting modulation modules 103A, 103B, 103C; one or more modules 103A, 103B, 103C that modulate light per ambient lighting; one or more modules 103A, 103B, 103C that modulate light in response to glasses and/or glasses detection and/or glare and/or glare detection; one or more document scanner modules 103A, 103B, 103C; one or more credit card reader and/or other payment modules 103A, 103B, 103C (which may and/or may not integrate with one or more other modules 103A, 103B, 103C); one or more barcode reader modules 103A, 103B, 103C; one or more contiguous lighting modules 103A, 103B, 103C; one or more FPR optimized angle modules 103A, 103B, 103C; one or more drainage modules 103A, 103B, 103C; one or more uplighting benefit modules 103A, 103B, 103C; and so on.

Additionally, in various examples, other devices may be used with the modular biometric station system 100. By way of illustration, a modular biometric station formed from the modular biometric station system 100 may be mounted to one or more stands, such as a desk height stand, a counter height stand, and so on. In various examples, the modular biometric station formed from the modular biometric station system 100 may use one or more power and/or communication cords. In such examples, one or more cord covers may be used, which may perform one or more security functions by protecting the one or more cords, by sounding one or more alarms and/or triggering one more alerts and/or lock down functions if one or more cord covers are tampered with, and so on.

Although the modular biometric station system 100 is illustrated and described as including particular components arranged in a particular configuration that perform particular functions, it is understood that this is an example. In various implementations, various arrangements of various components that perform various functions may be implemented without departing from the scope of the present disclosure.

One or more components of the modular biometric station system 100 may be used to communicate with one or more identity system devices. Such an identity system device may store identity information (such as one or more names, addresses, telephone numbers, social security numbers, patient identification numbers or other identifiers, insurance data, financial data, health information (such as one or more temperatures, pupil dilation, medical diagnoses, immunocompromised conditions, medical histories, medical records, infection statuses, vaccinations, immunology data, results of antibody tests evidencing that a person has had a particular communicable illness and recovered, blood test results, saliva test results, and/or the like), and so on) associated with the identities of people (which may be verified identities, where the identities are verified as corresponding to the particular person named and/or where the identity information is verified as valid). Alternatively and/or additionally, some or all of the health information may be stored separately from the identity information but otherwise associated with the identity information, such as in a Health Insurance Portability and Accountability Act ("HIPAA") compliant or other data store or enclave. Such a data store or enclave may be stored on one or more different storage media than the identity information, or may be stored on the same storage medium or media and logically isolated from the identity information. The health information may be simultaneously and/or substantially simultaneously accessible as the identity information, such as where the identity information includes a health information identifier or key that may be used to access the separately stored health information. The identity system device may control access to the identity information and/or the health information using identification information that is associated with the identity information. The identification information may include biometric data (which may include one or more digital representations of one or more fingerprints, blood vessel scans, palm-vein scans, palm scans, voiceprints, facial images, retina images, iris images, deoxyribonucleic acid sequences, heart rhythms, gaits, and so on), one or more logins and/or passwords, authorization tokens, social media and/or other accounts, and so on. In various implementations, the identity system device may allow the person associated with an identity to control access to the identity information, the health information, and/or other information (such as payment account information, health information (such as medical records, HIPAA protected information in order to be compliant with various legal restrictions, and so on), contact information, and so on. The identity system device may control access to such information according to input received from the person. The identity system device may be operable to communicate with one or more components of the modular biometric station system 100 in order to handle requests to provide the identity information and/or the health information, update and/or otherwise add to the identity information and/or the health information, provide attestations regarding and/or related to the identity information and/or the health information (such as whether or not a person is of a particular age, whether or not a person has a particular license or insurance policy, whether or not a person has been monitored as having particular health information, whether or not a person has had a particular vaccination, whether or not an antibody test evidences that a person has had a particular communicable illness and recovered, whether or not a person has a particular ticket or authorization, whether or not a person has been monitored as having particular antibodies, whether or not a person has been assigned a particular medical diagnosis, and so on), evaluate health information stored in the identity information and/or otherwise associated with the identity information and/or other information stored in the identity information, perform transactions, allow or deny access, route one or more persons, and/or perform one or more other actions.

The identity system device may be any kind of electronic device and/or cloud and/or other computing arrangement. Examples of such devices include, but are not limited to, one or more desktop computing devices, laptop computing devices, mobile computing devices, wearable devices, tablet computing devices, mobile telephones, kiosks and/or other stations, smart phones, printers, displays, vehicles, kitchen appliances, entertainment system devices, digital media players, and so on. The identity system device may include one or more processors and/or other processing units or controllers, communication units, non-transitory storage media, and/or other components. The processor may execute one or more sets of instructions stored in the non-transitory storage media to perform various functions, such as receiving and/or storing biometric data and/or other identification information, receiving and/or storing identity information and/or health information, matching one or more received digital representations of biometrics and/or other identification information to stored data, retrieving identity information and/or health information associated with stored data matching one or more received digital representations of biometrics and/or other identification information, providing retrieved identity information and/or health information, communicating with the modular biometric station via the network using the communication unit, and so on.

Similarly, the modular biometric station formed from the modular biometric station system 100 may be any kind of device. The modular biometric station formed from the modular biometric station system 100 (and/or the core unit 101 and/or one or more of the end caps 102 and/or one or more of the modules 103) may include one or more processors and/or other processing units and/or controllers, one or more non-transitory storage media (which may take the form of, but is not limited to, a magnetic storage medium; optical storage medium; magneto-optical storage medium; read only memory; random access memory; erasable programmable memory; flash memory; and so on), one or more communication units; one or more health sensors (such as a thermometer and/or other thermal camera and/or other thermal sensor, a blood pressure sensor, a blood test sensor, a blood vessel scanner, a palm-vein scanner, a palm scanner, a still image and/or video camera, a 2D and/or 3D image sensor, a saliva sensor, a breath sensor, a deoxyribonucleic acid sensor, a heart rhythm monitor, a microphone, sweat sensors, and so on); one or more biometric readers (such as a fingerprint scanner, a blood vessel scanner, a palm-vein scanner, a palm scanner, an optical fingerprint scanner, a phosphorescent fingerprint scanner, a still image and/or video camera, a 2D and/or 3D image sensor, a capacitive sensor, a saliva sensor, a deoxyribonucleic acid sensor, a heart rhythm monitor, a microphone, and so on), and/or one or more other components. The processor may execute one or more sets of instructions stored in the non-transitory storage media to perform various functions, such as using the biometric reader to obtain one or more digital representations of one or more biometrics (such as a digital representation of a fingerprint, a blood vessel scan, a palm-vein scan, a palm scan, a voiceprint, a facial image, a retina image, an iris image, a deoxyribonucleic acid sequence, a heart rhythm, a gait, and so on) for a person, obtain health information for a person using the health sensor, communicate with the identity system device via the network using the communication unit, and so on.

Figure 9:
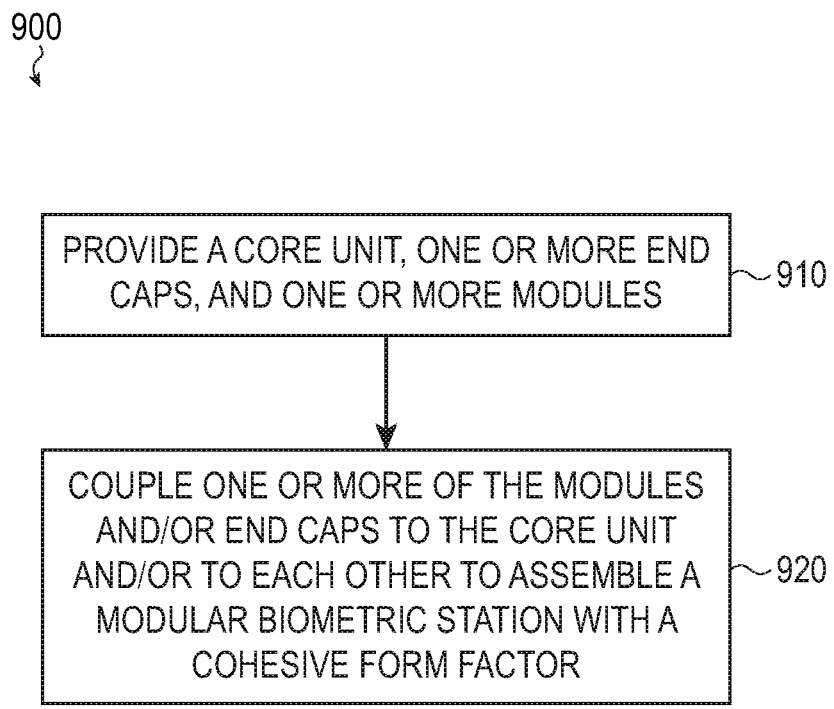
FIG. 9 is a flow chart illustrating an example method for providing a modular biometric station with a cohesive form factor.
Figure 10A:
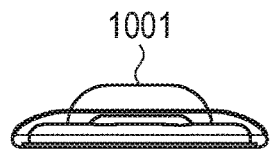
FIG. 10A depicts a top view of an additional example core unit.
Figure 10B:
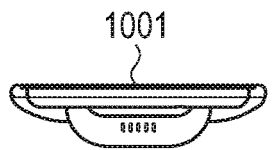
FIG. 10B depicts a bottom view of the additional example core unit of FIG. 10A.
Figure 10C:
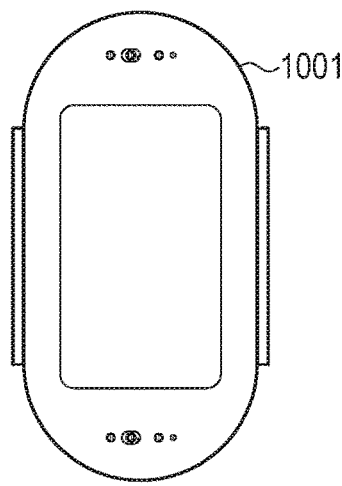
FIG. 10C depicts a front view of the additional example core unit of FIG. 10A.
Figure 10D:
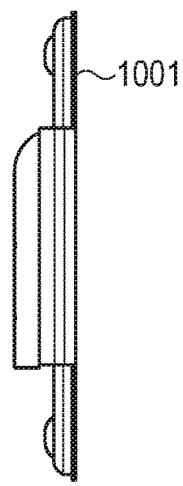
FIG. 10D depicts a side view of the additional example core unit of FIG. 10A.
Figure 10E:
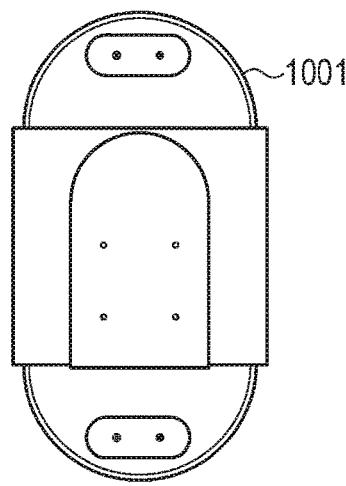
FIG. 10E depicts a back view of the additional example core unit of FIG. 10A.
Figure 10F:
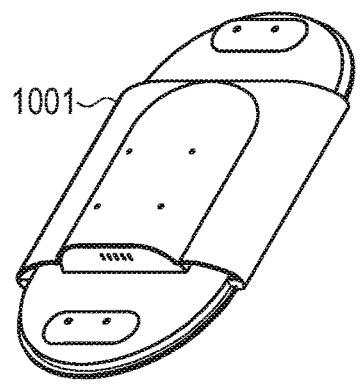
FIG. 10F depicts a back isometric view of the additional example core unit of FIG. 10A.
Figure 10G:
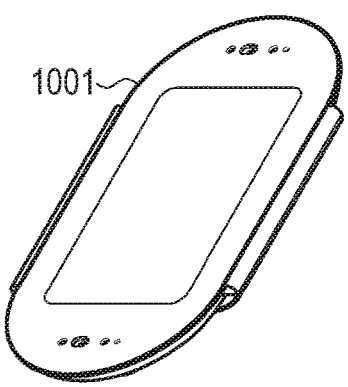
FIG. 10G depicts a front isometric view of the additional example core unit of FIG. 10A.
Figure 11A:
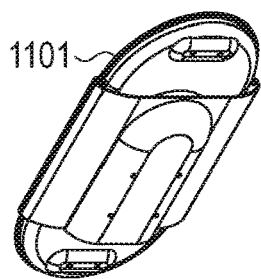
FIG. 11A depicts a back isometric view of an additional example core unit from a first orientation.
Figure 11B:
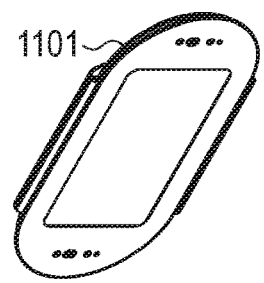
FIG. 11B depicts a front isometric view of the additional example core unit of FIG. 11A from the first orientation.
Figure 11C:
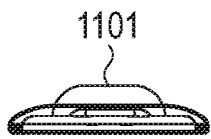
FIG. 11C depicts a top view of the additional example core unit of FIG. 11A.
Figure 11D:
FIG. 11D depicts a bottom view of the additional example core unit of FIG. 11A.
Figure 11E:
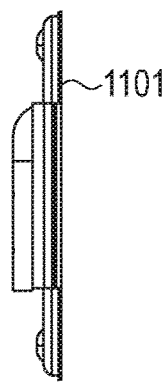
FIG. 11E depicts a side view of the additional example core unit of FIG. 11A.
Figure 11F:
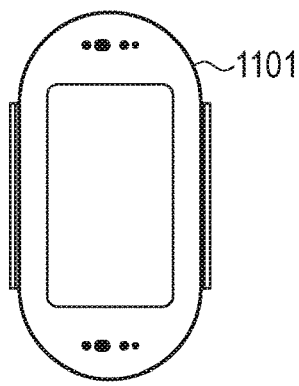
FIG. 11F depicts a front view of the additional example core unit of FIG. 11A.
Figure 11G:
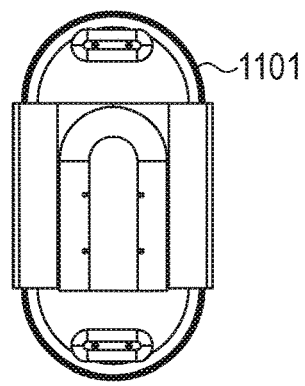
FIG. 11G depicts a back view of the additional example core unit of FIG. 11A.
Figure 11H:
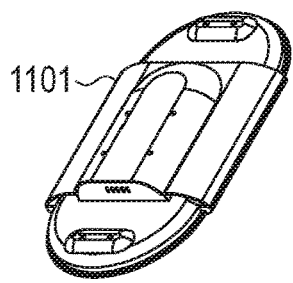
FIG. 11H depicts a back isometric view of the additional example core unit of FIG. 11A from a second orientation.
Figure 11I:
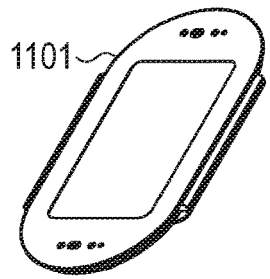
FIG. 11I depicts a front isometric view of the additional example core unit of FIG. 11A from a second orientation.
Figure 15A:
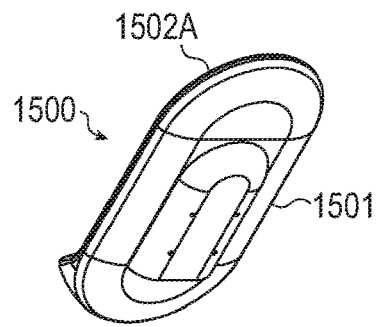
FIG. 15A depicts a back isometric view of an additional example modular biometric station with a standalone end cap and a module end cap coupled to a module having a fingerprint reader from a first orientation.
Figure 15B:
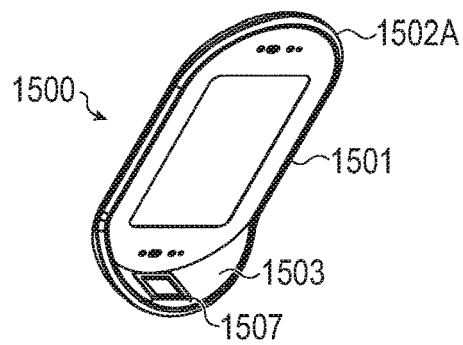
FIG. 15B depicts a front isometric view of the additional example modular biometric station of FIG. 15A from the first orientation.
Figures 15C, 15D:
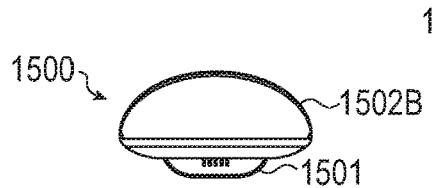
FIG. 15C depicts a top view of the additional example modular biometric station of FIG. 15A.
FIG. 15D depicts a bottom view of the additional example modular biometric station of FIG. 15A.
Figure 15E:
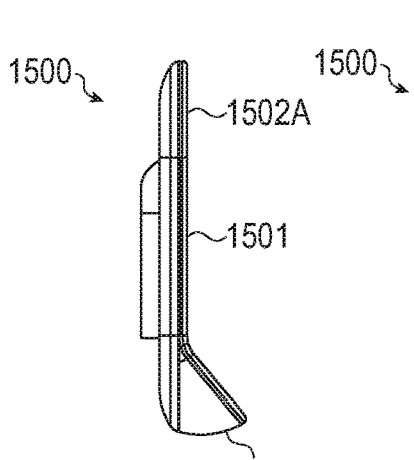
FIG. 15E depicts a side view of the additional example modular biometric station of FIG. 15A.
Figure 15F:
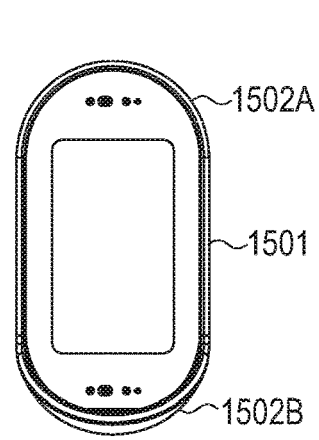
FIG. 15F depicts a front view of the additional example modular biometric station of FIG. 15A.
Figure 15G:
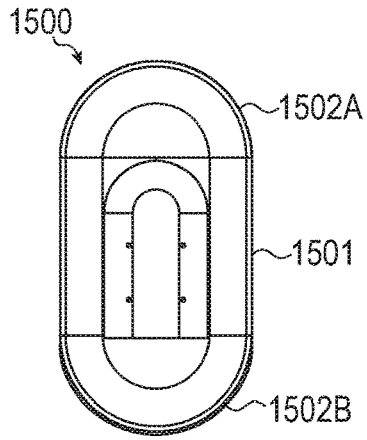
FIG. 15G depicts a back view of the additional example modular biometric station of FIG. 15A.
Figure 15H:
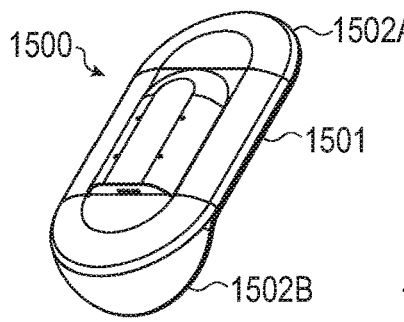
FIG. 15H depicts a back isometric view of the additional example modular biometric station of FIG. 15A from a second orientation.
Figure 15I:
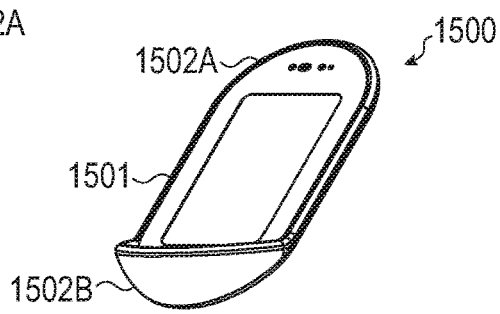
FIG. 15I depicts a front isometric view of the additional example modular biometric station of FIG. 15A from a second orientation.
Figure 17A:
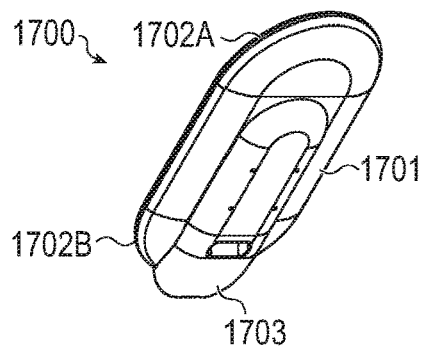
FIG. 17A depicts a back isometric view of an additional example modular biometric station with a standalone end cap and a module end cap coupled to a module having a barcode reader from a first orientation.
Figure 17B:
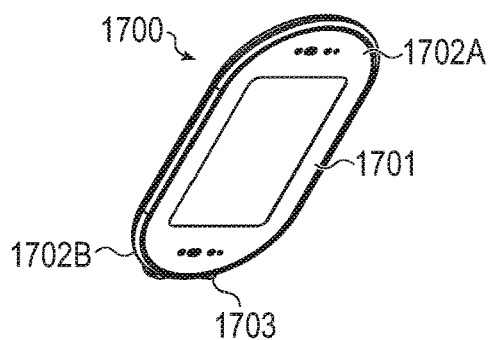
FIG. 17B depicts a front isometric view of the additional example modular biometric station of FIG. 17A from the first orientation.
Figure 17C:
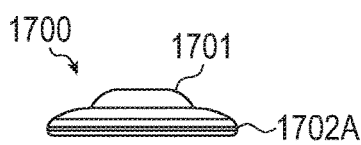
FIG. 17C depicts a top view of the additional example modular biometric station of FIG. 17A.
Figure 17D:
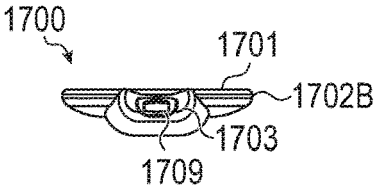
FIG. 17D depicts a bottom view of the additional example modular biometric station of FIG. 17A.
Figure 17E:
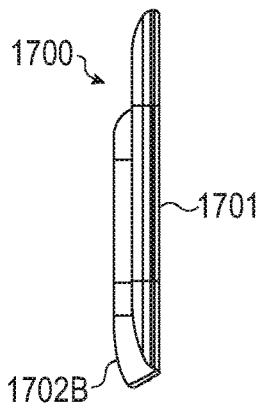
FIG. 17E depicts a side view of the additional example modular biometric station of FIG. 17A.
Figure 17F:
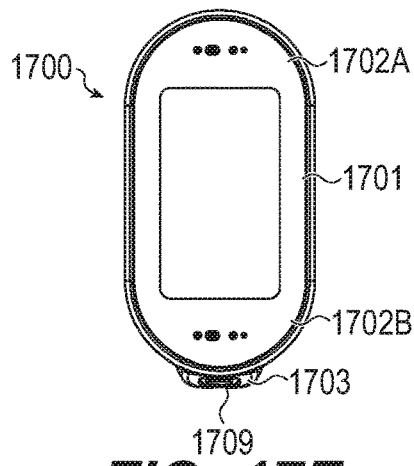
FIG. 17F depicts a front view of the additional example modular biometric station of FIG. 17A.
Figure 17G:
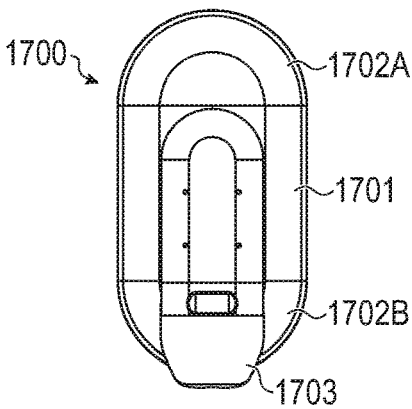
FIG. 17G depicts a back view of the additional example modular biometric station of FIG. 17A.
Figure 17H:
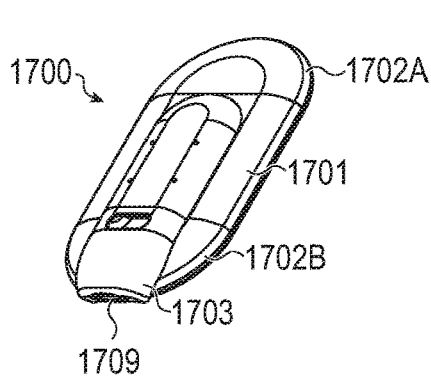
FIG. 17H depicts a back isometric view of the additional example modular biometric station of FIG. 17A from a second orientation.
Figure 17I:
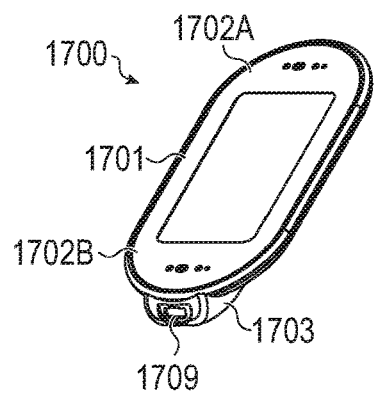
FIG. 17I depicts a front isometric view of the additional example modular biometric station of FIG. 17A from a second orientation.
Figure 18A:
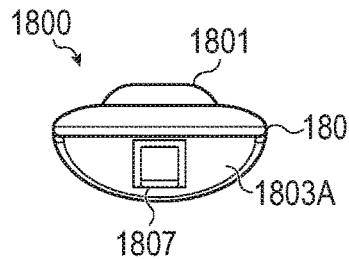
FIG. 18A depicts a top view of an additional example modular biometric station with a standalone end cap and a module end cap coupled to a module having a fingerprint reader and a barcode reader.
Figure 18B:
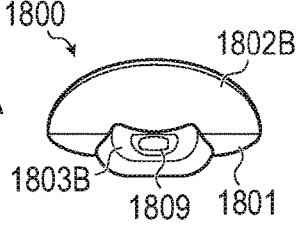
FIG. 18B depicts a bottom view of the additional example modular biometric station of FIG. 18A.
Figure 18C:
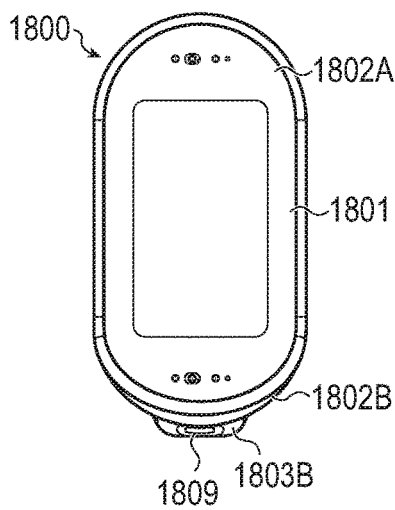
FIG. 18C depicts a front view of the additional example modular biometric station of FIG. 18A.
Figure 18D:
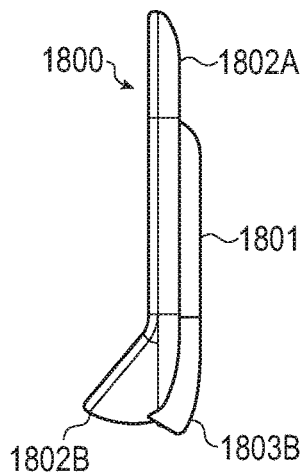
FIG. 18D depicts a side view of the additional example modular biometric station of FIG. 18A.
Figure 18E:
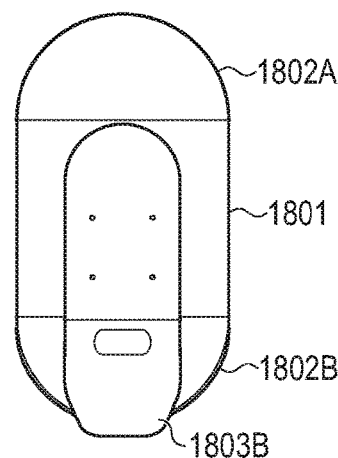
FIG. 18E depicts a back view of the additional example modular biometric station of FIG. 18A.
Figure 18F:
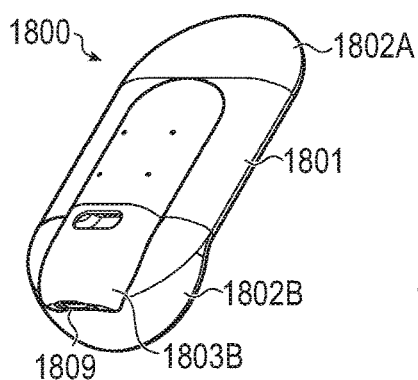
FIG. 18F depicts a front isometric view of the additional example modular biometric station of FIG. 18A.
Figure 18G:
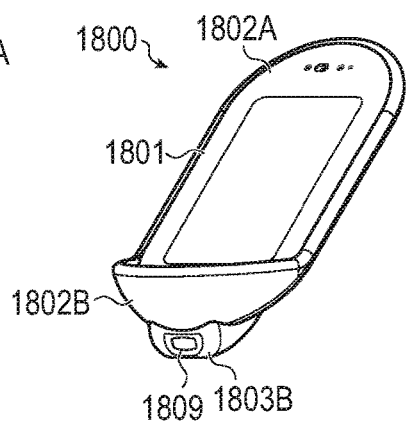
FIG. 18G depicts a back isometric view of the additional example modular biometric station of FIG. 18A.

FIG. 9 is a flow chart illustrating an example method 900 for providing a modular biometric station with a cohesive form factor.

At operation 910, a core unit, one or more end caps, and one or more modules may be provided.

At operation 920, one or more of the modules and/or end caps may be coupled to the core unit and/or to each other to assemble a modular biometric station with a cohesive form factor. For example, one or more of the modules may be coupled to the core unit by being coupled to one or more end caps that are coupled to the core unit.

In various examples, this example method 900 may be implemented using a group of interrelated software modules or components that perform various functions discussed herein. These software modules or components may be executed within a cloud network and/or by one or more computing devices. For example, such software modules or components may be used to direct the operations of one or more computer numerical control machines that may assemble one or more of the components discussed above, perform one or more of the operations discussed above, and so on.

Although the example method 900 is illustrated and described as including particular operations performed in a particular order, it is understood that this is an example. In various implementations, various orders of the same, similar, and/or different operations may be performed without departing from the scope of the present disclosure.

For example, the method 900 is illustrated and described as providing and coupling one or more end caps. However, it is understood that this is an example. In some implementations, the one or more end caps may be omitted. Various configurations are possible and contemplated without departing from the scope of the present disclosure.

FIGS. 10A-10G depict views of an additional example core unit 1001. FIGS. 11A-11I depict views of an additional example core unit 1101. FIGS. 12A-G depict views of an additional example core unit 1201 with standalone end caps 1202A. FIGS. 13A-13I depict views of an additional example core unit 1301 with standalone end caps 1302A. FIGS. 14A-14G depict views of an additional example modular biometric station 1400 with a standalone end cap 1402A and a module end cap 1402B coupled to a module 1403 having a fingerprint reader 1407. FIGS. 15A-15I depict views of an additional example modular biometric station 1500 with a standalone end cap 1502A and a module end cap 1502B coupled to a module 1503 having a fingerprint reader 1507. FIGS. 16A-16G depict views of an additional example modular biometric station 1600 with a standalone end cap 1602A and a module end cap 1602B coupled to a module 1603 having a barcode reader 1609. FIGS. 17A-17I depict views of an additional example modular biometric station 1700 with a standalone end cap 1702A and a module end cap 1702B coupled to a module 1703 having a barcode reader 1709. FIGS. 18A-18G depict views of an additional example modular biometric station 1800 with a standalone end cap 1802A and a module end cap 1802B coupled to a first module 1803A having a fingerprint reader 1807 and a second module 1803B having a barcode reader 1809. FIGS. 19A-19I depict views of an additional example modular biometric station 1900 with a standalone end cap 1902A and a module end cap 1902B coupled to a first module 1903A having a fingerprint reader 1907 and a second module 1903B having a barcode reader 1909.

With respect to FIGS. 10A-19I, in various examples, one or more of the respective standalone end caps 1002A-1902A may be non-destructively removed and a module end cap 1002B-1902B may be coupled to the respective core units 1001-1901 in their place. One or more modules 1603-1903 may be coupled to the respective module end cap 1002B-1902B. Similarly, in various examples, one or more of the respective module end caps 1002B-1902B and/or the module 303 may be non-destructively removed and a standalone end cap 1002A-1902A may be coupled to the respective core unit 1001-1901 in their place. Various configurations are possible and contemplated without departing from the scope of the present disclosure.

Figure 20B:
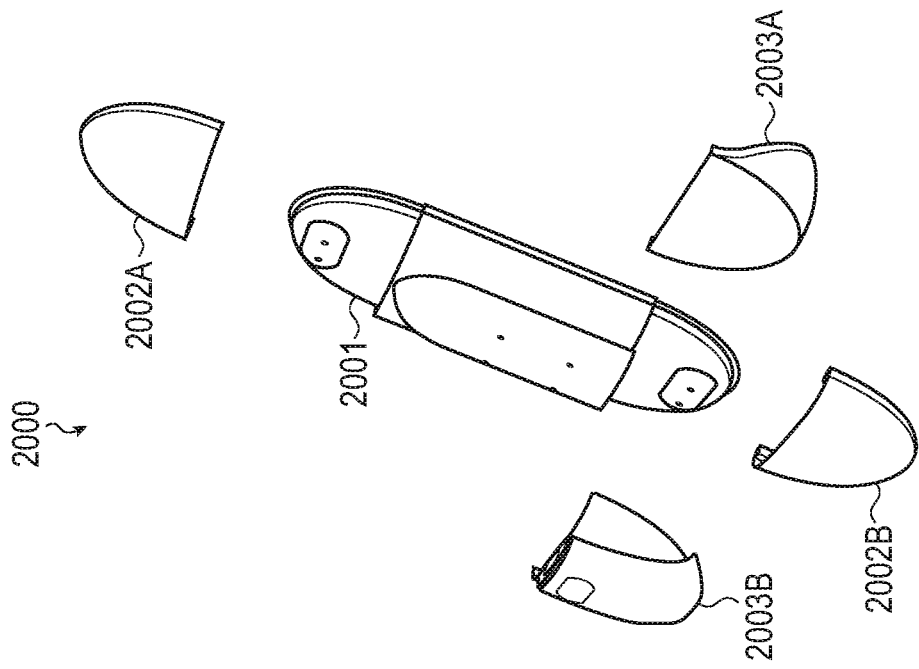
FIG. 20B depicts a back exploded view of the additional example modular biometric station of FIG. 20A.
Figure 20A:
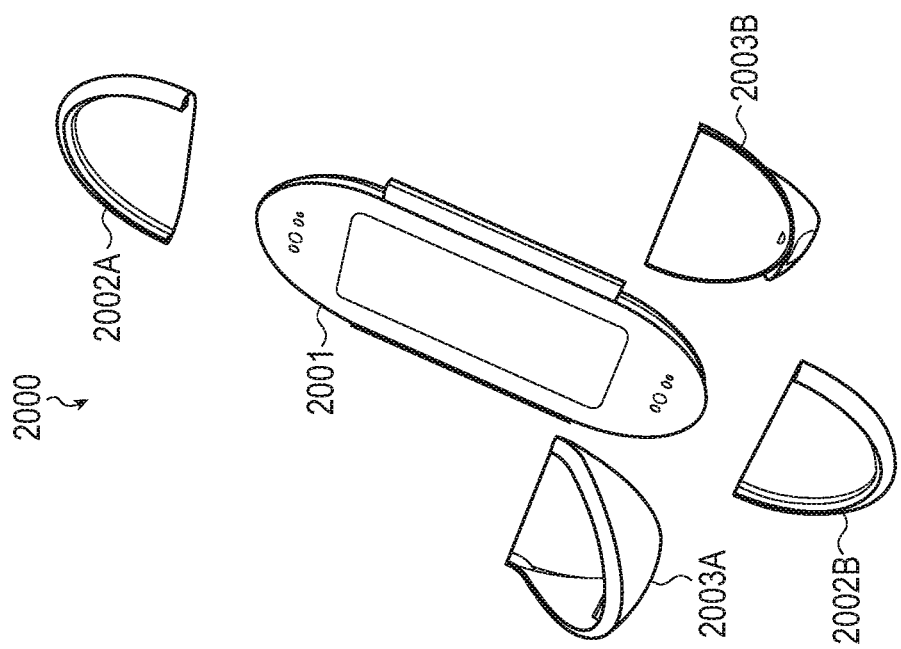
FIG. 20A depicts a front exploded view of an additional example modular biometric station.

FIGS. 20A-20B depict exploded views of an additional example modular biometric station 2000. The example modular biometric station 2000 may include a core unit 2001, a standalone end cap 2002A that may communicably and electrically couple to the core unit 2001, a module end cap 2002B that may communicably and electrically couple to the core unit 2001, a first module 2003A (which may include a component such as a fingerprint reader) that may communicably and electrically couple to the core unit 2001 via the module end cap 2002B, and a second module 2003B (which may include a component such as a barcode reader) that may communicably and electrically couple to the core unit 2001 via the module end cap 2002B.

Figure 21A:
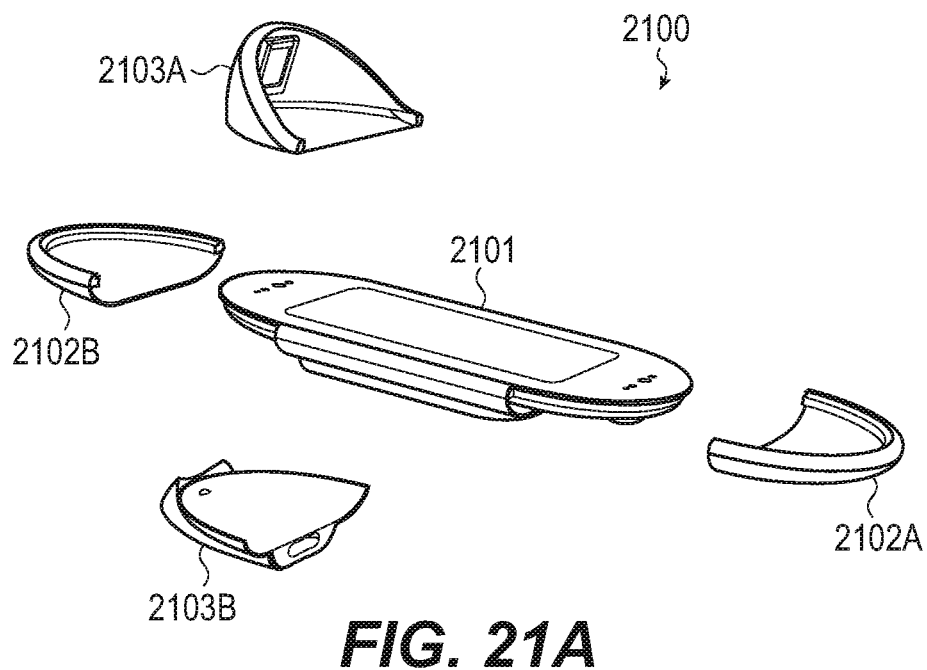
FIG. 21A depicts a front exploded view of an additional example modular biometric station.
Figure 21B:
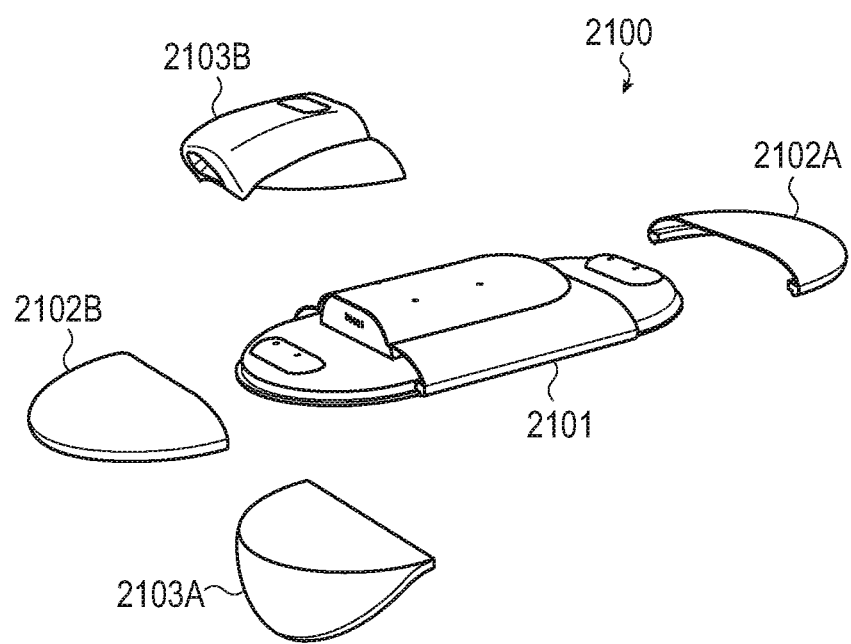
FIG. 21B depicts a back exploded view of the additional example modular biometric station of FIG. 21A.

FIGS. 21A-21B depict exploded views of an additional example modular biometric station 2100. The example modular biometric station 2100 may include a core unit 2101, a standalone end cap 2102A that may communicably and electrically couple to the core unit 2101, a module end cap 2102B that may communicably and electrically couple to the core unit 2101, a first module 2103A (which may include a component such as a fingerprint reader) that may communicably and electrically couple to the core unit 2101 via the module end cap 2102B, and a second module 2103B (which may include a component such as a barcode reader) that may communicably and electrically couple to the core unit 2101 via the module end cap 2102B.

FIGS. 22A-22D depict views of another example modular biometric station 2200 with standalone end caps 2202A and a core unit 2201. FIGS. 22E-H depict views of the modular biometric station 2200 of FIG. 22A with the standalone end caps 2202A removed.

Figure 22D:
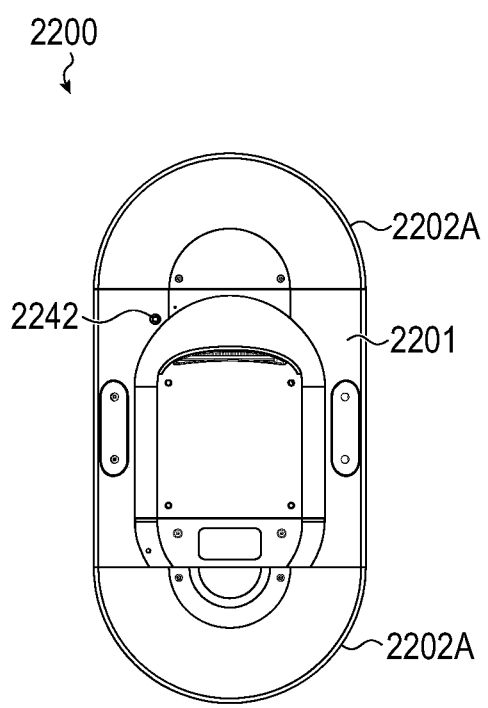
FIG. 22D depicts a back view of the modular biometric station of FIG. 22A.
Figure 22E:
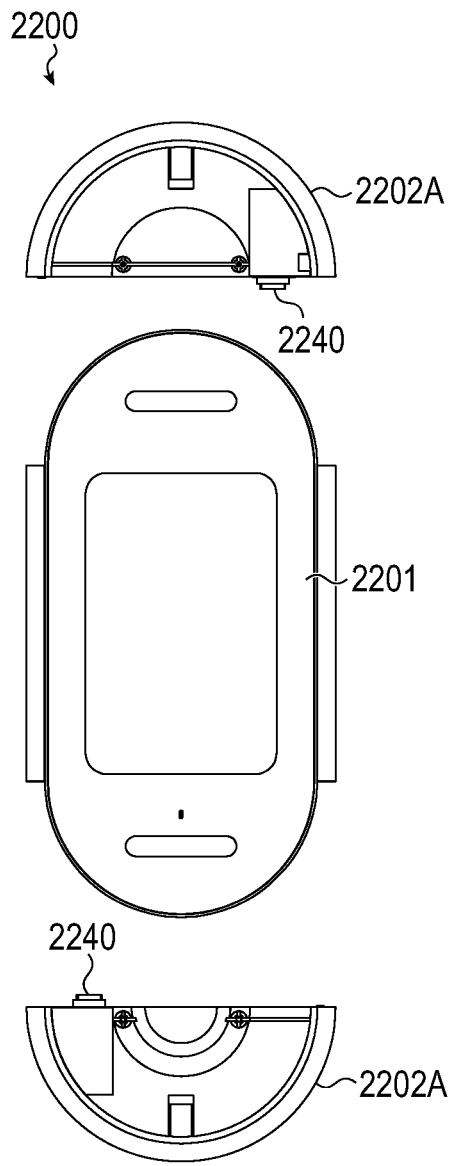
FIG. 22E depicts a front view of the modular biometric station of FIG. 22A with the standalone end caps removed.
Figure 22F:
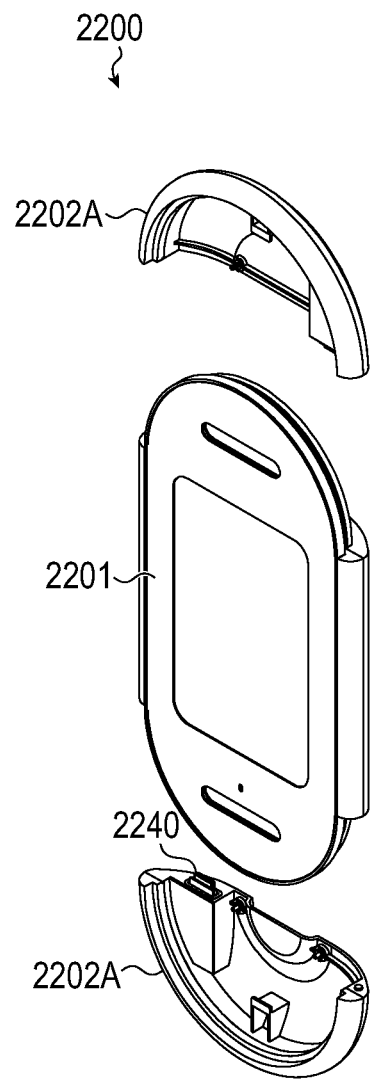
FIG. 22F depicts a front isometric view of the modular biometric station of FIG. 22A from a first orientation with the standalone end caps removed.
Figure 22G:
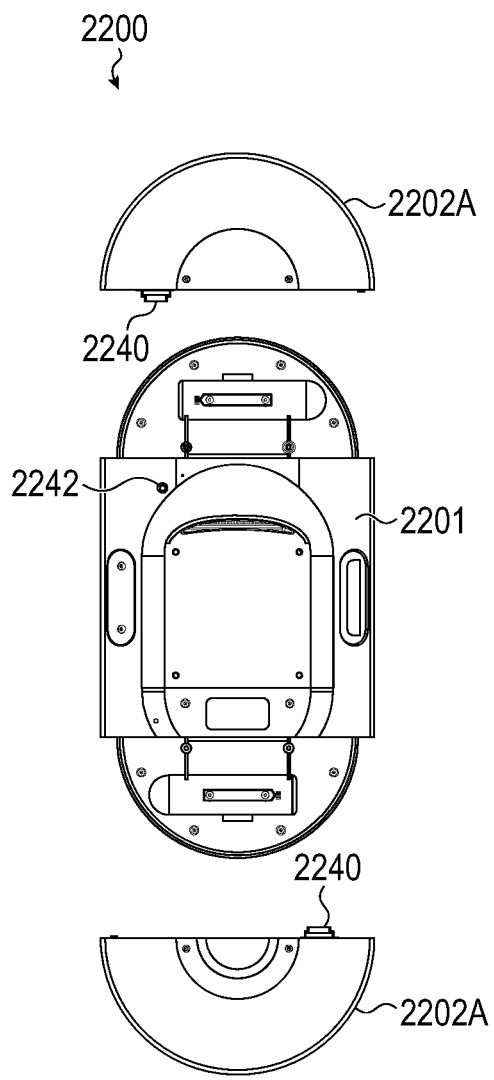
FIG. 22G depicts a back view of the modular biometric station of FIG. 22A with the standalone end caps removed.
Figure 22H:
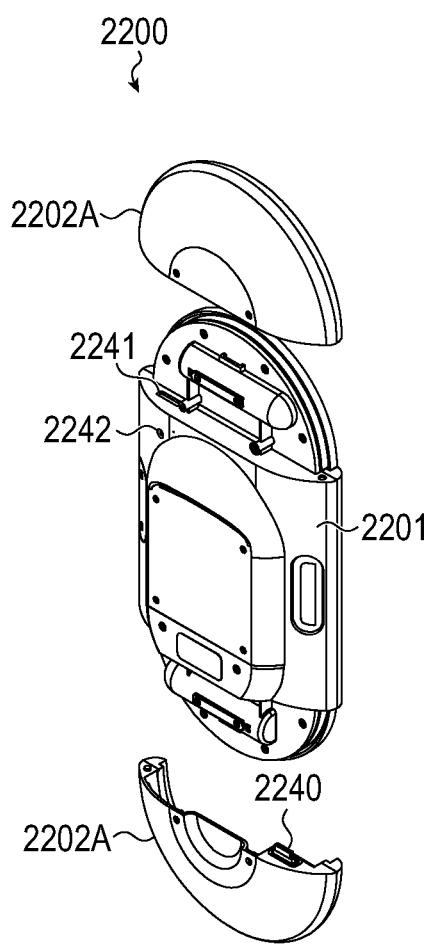
FIG. 22H depicts a back isometric view of the modular biometric station of FIG. 22A from the first orientation with the standalone end caps removed.
Figure 22I:
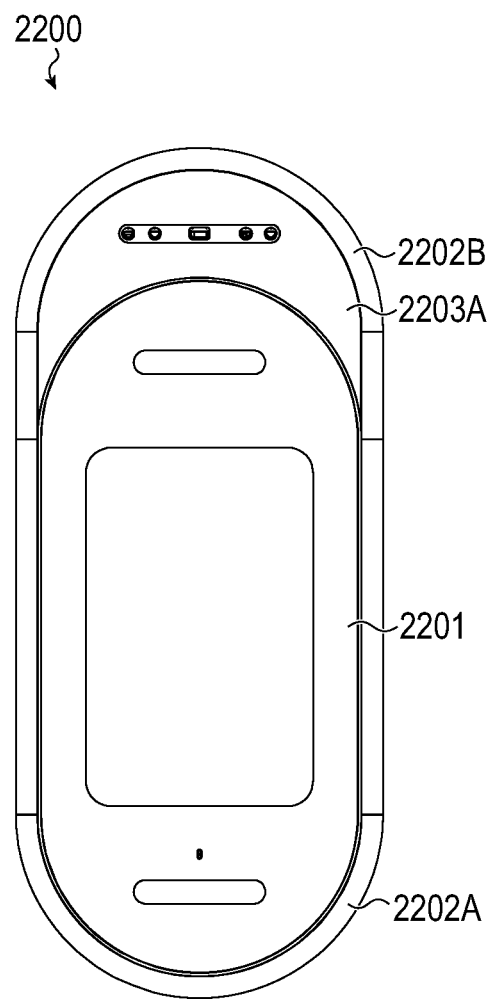
FIG. 22I depicts a front view of the modular biometric station of FIG. 22A with one of the standalone end caps replaced with a module end cap and a first module.
Figure 22J:
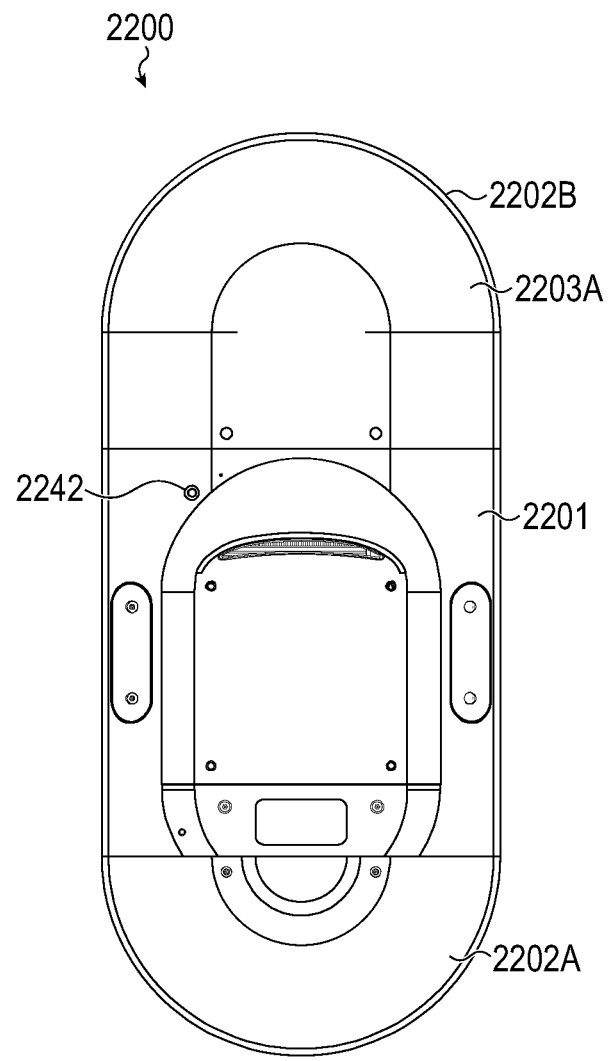
FIG. 22J depicts a back view of the modular biometric station of FIG. 22I.
Figure 22K:
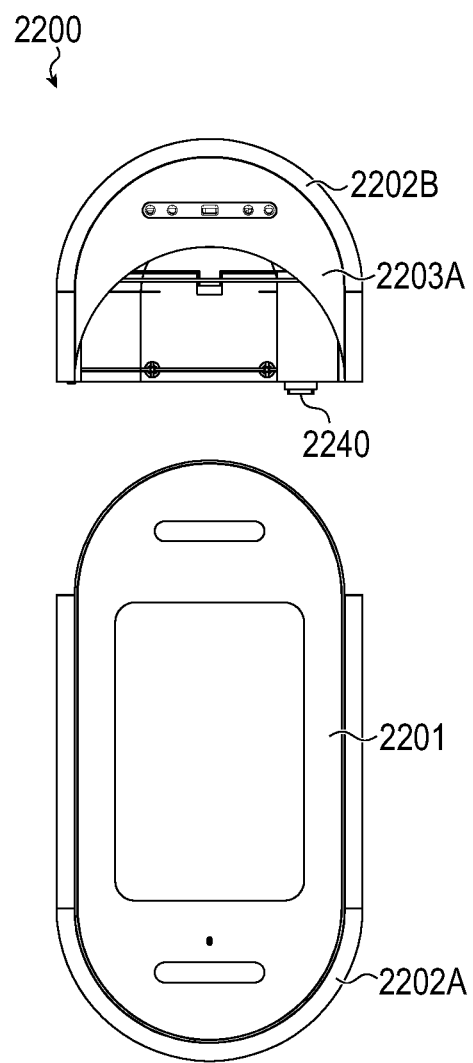
FIG. 22K depicts a front view of the modular biometric station of FIG. 22I with the module end cap and the first module removed.
Figure 22O:
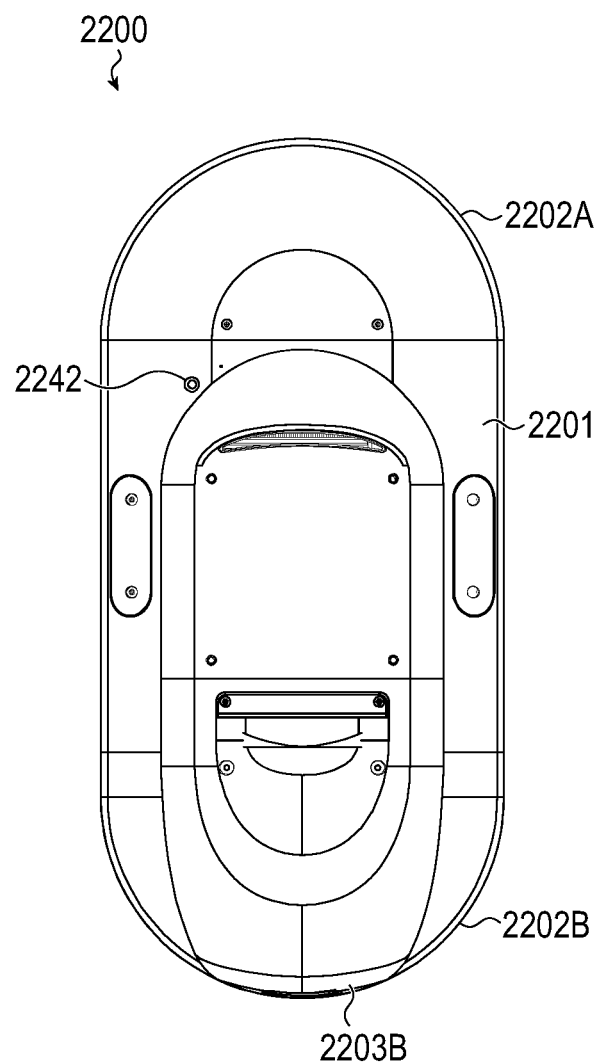
FIG. 22O depicts a back view of the modular biometric station of FIG. 22L.
Figure 22P:
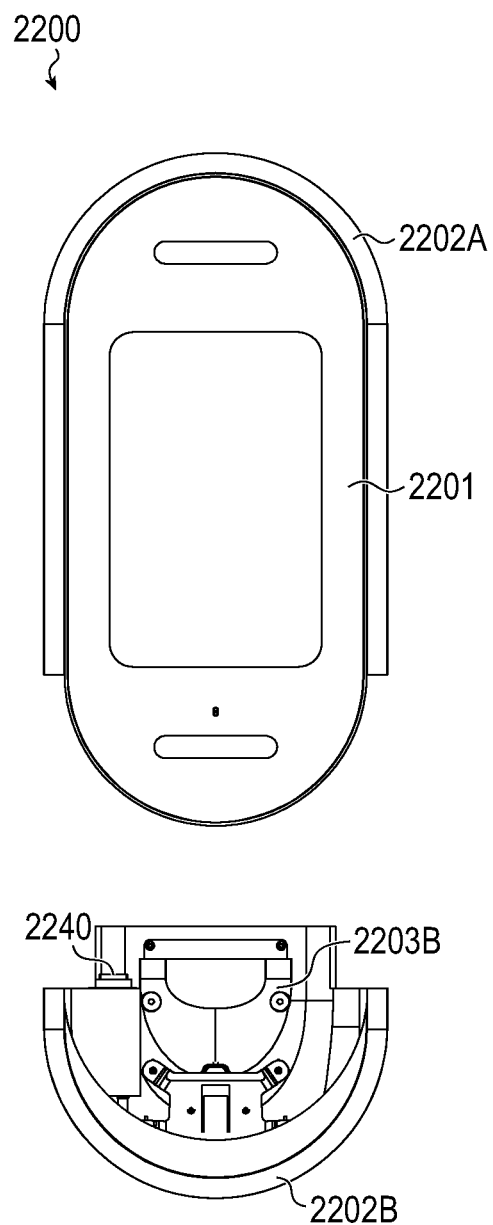
FIG. 22P depicts a front view of the modular biometric station of FIG. 22L with the modular cap and the second module removed.

FIG. 22I depicts a front view of the modular biometric station 2200 of FIG. 22A with one of the standalone end caps 2202A replaced with a module end cap 2202B and a first module 2203A. The first module 2203A may include a thermal imaging component. However, it is understood that this an example and that in various implementations the first module 2203A may include any number of a variety of different components, such as those discussed elsewhere herein, without departing from the scope of the present disclosure. Various configurations are possible and contemplated. FIGS. 22J-22K depict additional views of the modular biometric station 2200 of FIG. 22I.

FIG. 22L depicts a front view of the modular biometric station 2200 of FIG. 22A with one of the standalone end caps 2202A replaced with a module end cap 2202B and a second module 2203B. The second module 2203B may include a barcode reader component. However, it is understood that this an example and that in various implementations the second module 2203B may include any number of a variety of different components, such as those discussed elsewhere herein, without departing from the scope of the present disclosure. Various configurations are possible and contemplated. FIGS. 22M-22P depict additional views of the modular biometric station 2200 of FIG. 22L.

Figure 22Q:
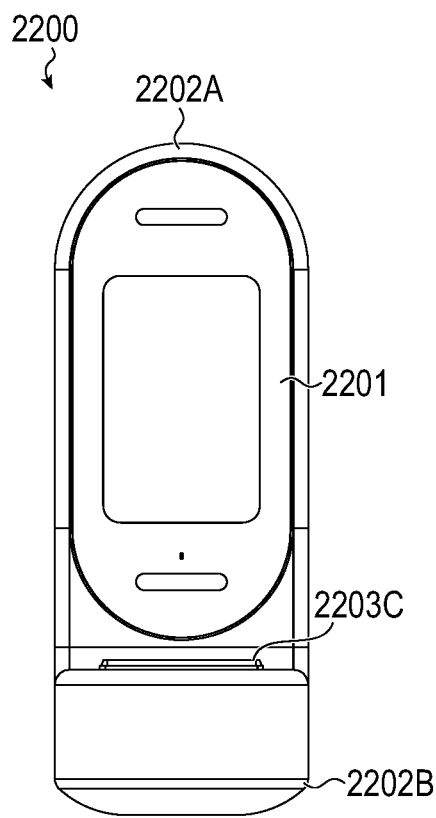
FIG. 22Q depicts a front view of the modular biometric station of FIG. 22A with one of the standalone end caps replaced with a module end cap and a third module.
Figure 22R:
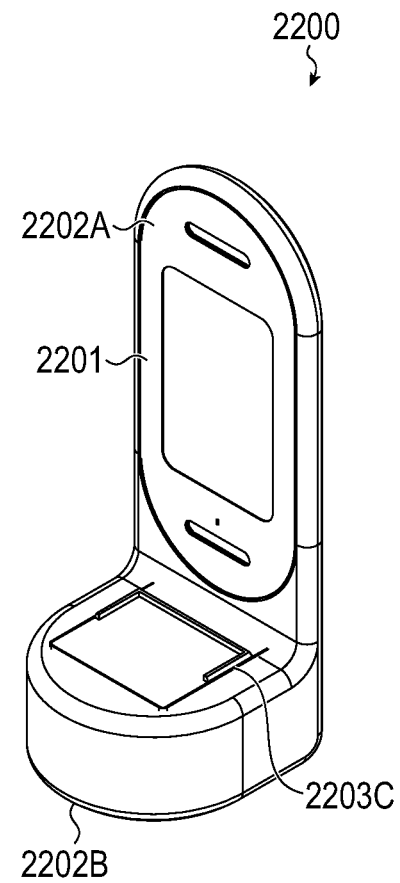
FIG. 22R depicts a front isometric view of the modular biometric station of FIG. 22Q from the first orientation.
Figure 22S:
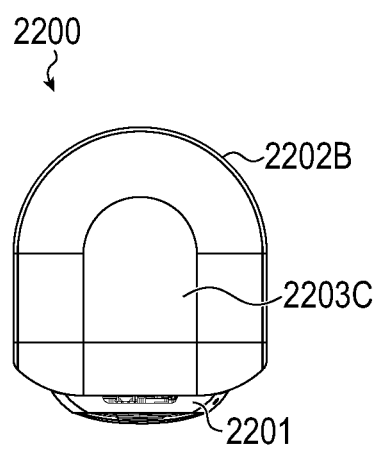
FIG. 22S depicts a bottom view of the modular biometric station of FIG. 22Q.
Figure 22T:
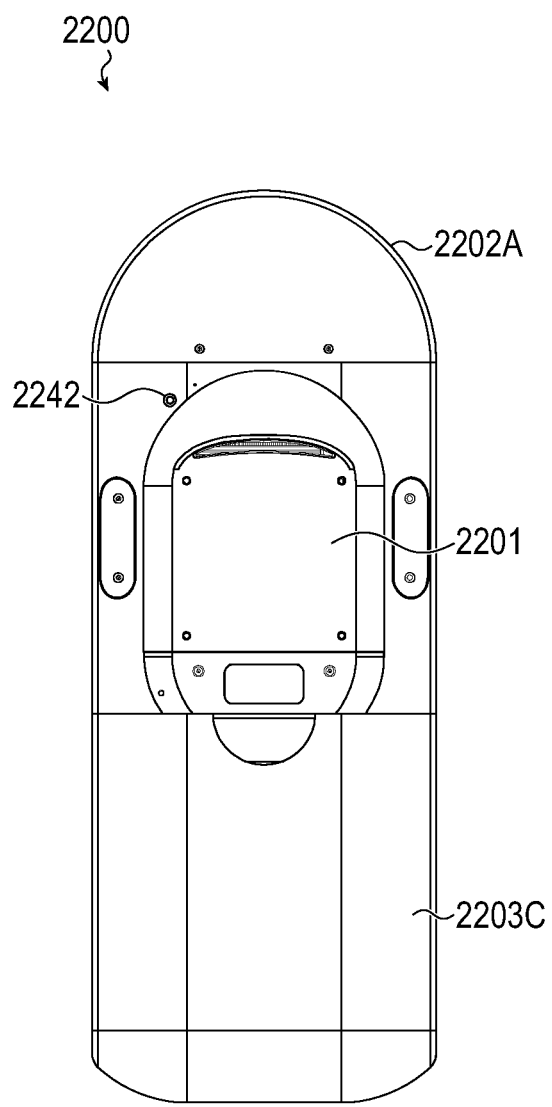
FIG. 22T depicts a back view of the modular biometric station of FIG. 22Q.
Figure 22U:
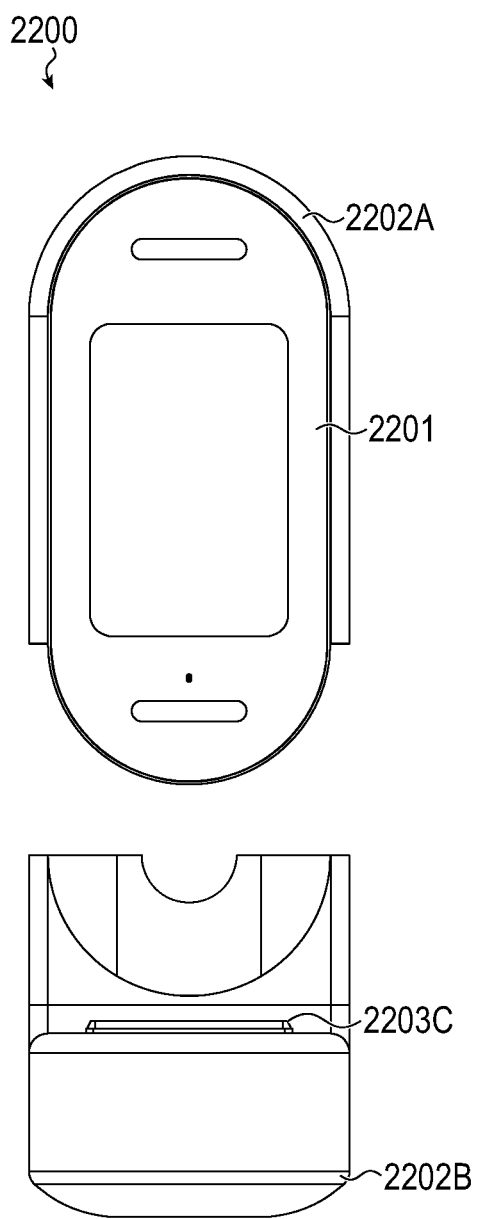
FIG. 22A depicts a front view of another example modular biometric station with standalone end caps and a core unit.
FIG. 22B depicts a top view of the modular biometric station of FIG. 22A.
FIG. 22C depicts a side view of the modular biometric station of FIG. 22A.
FIG. 22L depicts a front view of the modular biometric station of FIG. 22A with one of the standalone end caps replaced with a module end cap and a second module.
FIG. 22M depicts a side view of the modular biometric station of FIG. 22L.
FIG. 22N depicts a bottom view of the modular biometric station of FIG. 22L.

FIG. 22Q depicts a front view of the modular biometric station 2200 of FIG. 22A with one of the standalone end caps 2202A replaced with a module end cap 2202B and a third module 2203C. The third module 2203C may include a fingerprint reader component. However, it is understood that this an example and that in various implementations the third module 2203C may include any number of a variety of different components, such as those discussed elsewhere herein, without departing from the scope of the present disclosure. Various configurations are possible and contemplated. FIGS. 22R-22U depict additional views of the modular biometric station 2200 of FIG. 22Q.

Figure 22V:
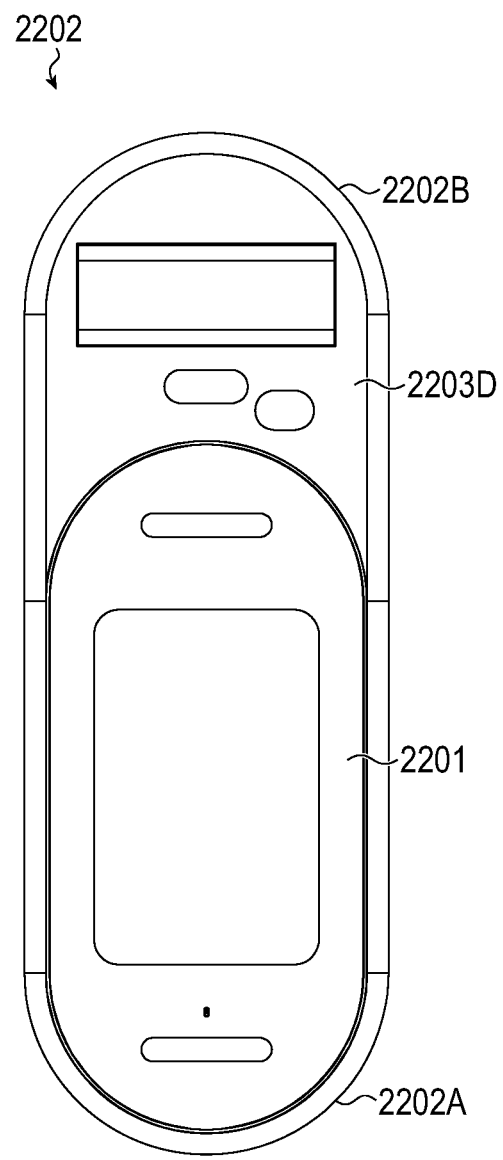
Figure 22W:
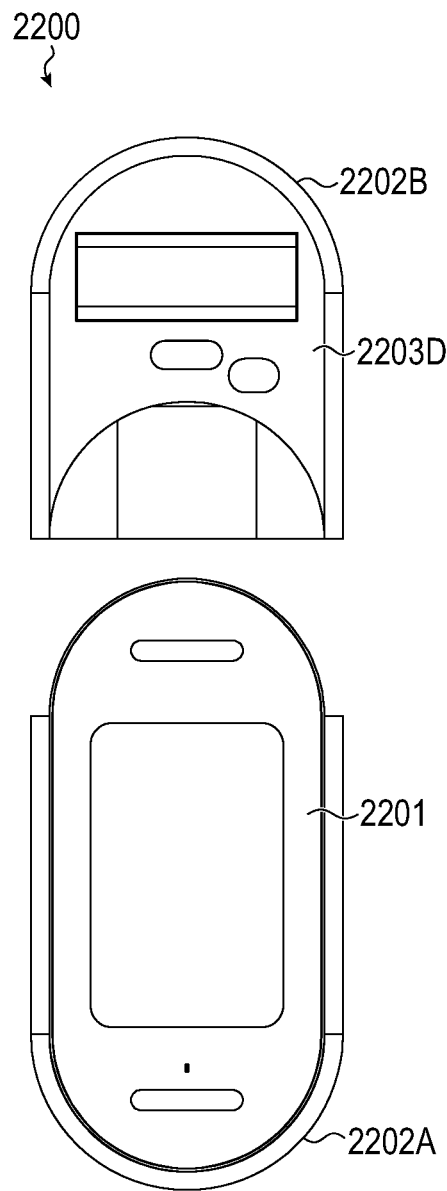
Figure 22X:
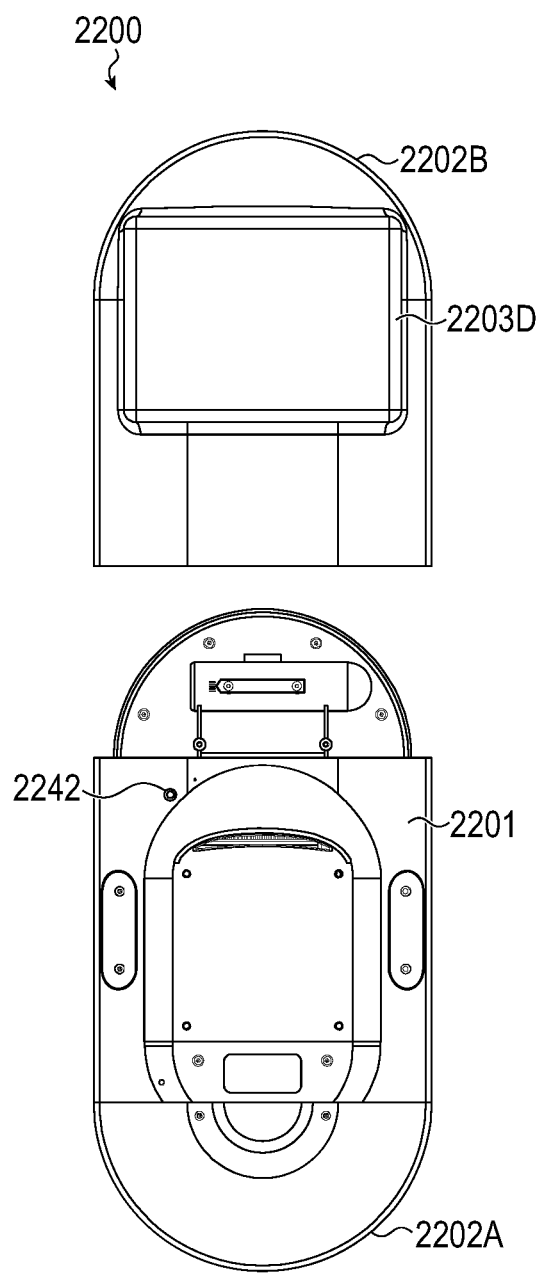

FIG. 22V depicts a front view of the modular biometric station 2200 of FIG. 22A with one of the standalone end caps 2202A replaced with a module end cap 2202B and a fourth module 2203D. The fourth module 2203D may include an iris reader component. However, it is understood that this an example and that in various implementations the fourth module 2203D may include any number of a variety of different components, such as those discussed elsewhere herein, without departing from the scope of the present disclosure. Various configurations are possible and contemplated. FIGS. 22W-22X depict additional views of the modular biometric station 2200 of FIG. 22V.

Figure 22Y:
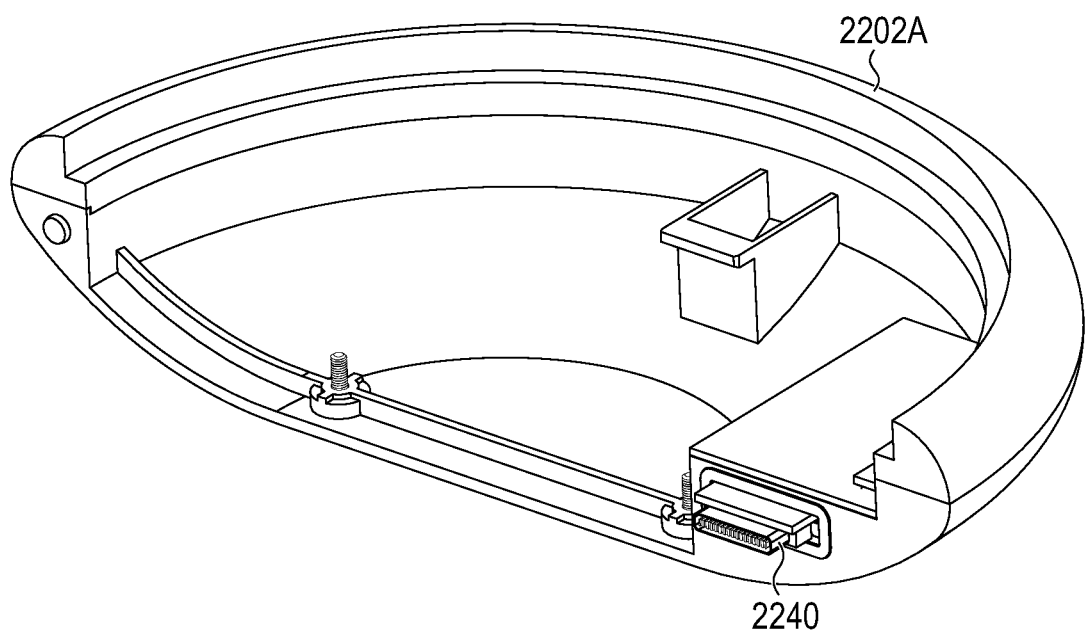
Figure 22Z:
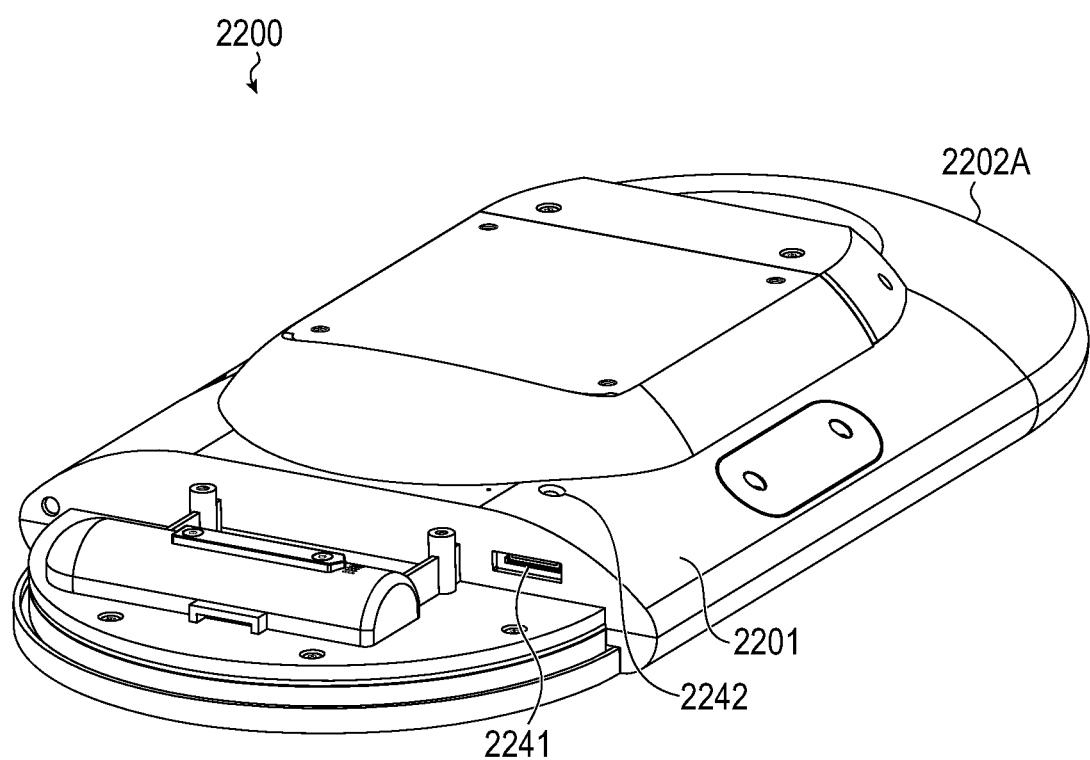

FIG. 22Y depicts an isometric view of one of the standalone end caps 2202A of FIG. 22A in isolation. FIG. 22Z depicts a back isometric view of the modular biometric station 2200 of FIG. 22A from a second orientation without one of the end caps 2202A.

An example of a connector 2240 of the standalone end cap 2202A is shown in FIGS. 22E-22H, 22K, 22P, and 22Y. Similarly, an example of connector 2241 of the core unit 2201 is shown in in FIGS. 22H and 22Z. The connector 2240 of the standalone end cap 2202A and the connector 2241 of the core unit 2201 may be any kind of connector (such as one or more Universal Serial Bus or "USB" ports or connectors, like USB 2.0 5 volt ports or connectors, USB 3.0 5 volt ports or connectors, USB C ports or connectors, and so on) that are operable to couple to one or more ports and/or other connectors (such as one or more Universal Serial Bus or "USB" ports or connectors, like USB 2.0 5 volt ports or connectors, USB 3.0 5 volt ports or connectors, USB C ports or connectors, and so on), such as one or more of the connectors discussed elsewhere herein. The connector 2240 of the standalone end cap 2202A and the connector 2241 of the core unit 2201 may be operable to mate and/or otherwise communicably and/or electrically connect the standalone end cap 2202*a* and the core unit 2201.

The module end cap 2202B may include one or more connectors similar to the connector 2240 of the standalone end cap 2202A and/or the connector 2241 of the core unit 2201. Such connectors may be operable to mate and/or otherwise communicably and/or electrically connect the modular end cap 2202B with one or more of the first module 2203A, the second module 2203B, the third module 2203C, the fourth module 2203D and/or the core unit 2201 such that data and/or power may be exchanged.

Similarly, one or more of the first module 2203A, the second module 2203B, the third module 2203C, and/or the fourth module 2203D may include one or more connectors similar to the connector 2240 of the standalone end cap 20\202A and/or the connector 2241 of the core unit 2201. Such connectors may be operable to mate and/or otherwise communicably and/or electrically connect the module end cap 2202B one or more of the first module 2203A, the second module 2203B, the third module 2203C, and/or the fourth module 2203D and the core unit 2201 such that data and/or power may be exchanged.

An example of an ambient light sensor 2242 is shown in FIGS. 22D, 22G-22H, 22J, 22O, 22T, 22X, and 22Z. The ambient light sensor 2242 may be positioned on the back of the core unit 2201 to protect the ambient light sensor 2242 from interference from one or more forward facing lighting components and/or other lighting components not facing the back of the core unit 2201. The core unit 2201 and/or other components of the modular biometric station 2200 may use the ambient light sensor 2242 to perform functions such as detecting ambient light for controlling one or more LEDs and/or other lighting components in order to adjust the ambient lighting for facial image capture, other biometric capture, and so on.

Although the above illustrates and describes a number of embodiments, it is understood that these are examples. In various implementations, various techniques of individual embodiments may be combined without departing from the scope of the present disclosure.

In various implementations, a modular biometric station system may include a core unit circuitry, a number of modules, a standalone end cap, and at least one module end cap. The core unit may include a display, at least one camera, at least one lighting component, at least a top port and a bottom port, and circuitry operable to detect power requirements of at least one component coupled to at least one of the top port or the bottom port and provide power according to the power requirements. The standalone end cap may be communicably and electrically coupleable to at least one of the top port or the bottom port. The at least one module end cap may be communicably and electrically coupleable to at least one of the top port or the bottom port, communicably and electrically coupleable to the number of modules, and operable to communicably and electrically connect a module of the number of modules and the core unit while connected to the module of the number of modules and the core unit.

In some examples, the module may include a bar code reader. In a number of examples, the at least one lighting component may be a first lighting component and the module may include a second lighting component. In various examples, the module may include a fingerprint scanner. In some examples, the module may include a thermal sensor. In some examples, the module may include a card reader. In some examples, the module may be operable to perform glasses detection.

In a number of examples, the end cap may be operable to cover at least one of the top port or the bottom port. In some examples, the core unit may be operable to use the at least one camera to perform facial recognition. In a number of examples, the at least one lighting component may be a first lighting component that is operable to perform a first lighting function and the module may include a second lighting component that is operable to perform a second lighting function.

In some implementations, a modular biometric station may include a core unit. The core unit may have at least a top connector and a bottom connector and circuitry operable to detect power requirements of at least one component coupled to at least one of the top connector or the bottom connector and provide power according to the power requirements. The modular biometric station may also include a module end cap that may be communicably and electrically coupled to a first of the top connector and the bottom connector and may include a first lighting component, a standalone end cap that may be communicably and electrically coupled to a second of the top connector and the bottom connector and may include a second lighting component, and a module that may be communicably and electrically communicably coupled to the first of the top connector and the bottom connector via the module end cap.

In various examples, the standalone end cap may be a first standalone end cap, the module end cap may be non-destructively removable from the first of the top connector and the bottom connector, and a second standalone end cap may be configured to communicably and electrically couple to the first of the top connector and the bottom connector after the module end cap is non-destructively removed. In a number of examples, the top connector and the bottom connector may be universal serial bus connectors. In various examples, the core unit may further include a first side connector and a second side connector. In some such examples, the first side connector may be positioned on an opposite side of the core unit from the second side connector.

In a number of implementations, a modular biometric station may include a core unit, circuitry, and a standalone end cap. The core unit may have at least a top connector and a bottom connector. The circuitry may be operable to detect power requirements of at least one component coupled to at least one of the top connector or the bottom connector and provide power according to the power requirements. The standalone end cap may be communicably and electrically coupled to one of the top connector and the bottom connector and may include a first lighting component. The standalone end cap may be non-destructively removable from the one of the top connector and the bottom connector. A module end cap that includes a second lighting component may be configured to communicably and electrically couple to the one of the top connector and the bottom connector after the standalone end cap is non-destructively removed. A module may be configured to communicably and electrically couple to the one of the top connector and the bottom connector via the module end cap.

In various examples, the core unit may be operable to perform biometric identification. In some examples, the core unit may be operable to perform a first type of biometric identification and the core unit may be operable to use the module to perform a second type of biometric identification when the module is communicably and electrically coupled to the one of the top connector and the bottom connector via the module end cap. In a number of examples, the core unit may be operable to communicate with a biometric identification system. In various examples, the core unit may be operable to perform glasses detection.

As described above and illustrated in the accompanying figures, the present disclosure relates to a modular biometric station system that may be used to form one or more modular biometric stations with cohesive form factors. The modular biometric station system may be used to form one or more biometric stations that include a core unit, one or more end caps, and one or more modules. The modules may be configured to communicably and electrically couple to one or more of the end caps. The end caps may be configured to communicably and electrically couple to the core unit and/or one or more of the modules and may communicably and electrically couple one or more of the modules to the core unit. The core unit, the end caps, and/or the modules may be able to communicably interact when coupled together. The core unit, end caps, and modules may all share a form factor. The core unit may include hardware and/or software that satisfies common requirements and the modules may include peripherals and/or other components that can be coupled to the core unit to adapt the modular biometric station to a variety of different needs of different applications. In this way, a single biometric station may be designed and used, whether or not with any of the modules and/or multiple modules, for all of the various applications for which the biometric station is to be used.

The present disclosure recognizes that biometric and/or other personal data is owned by the person from whom such biometric and/or other personal data is derived. This data can be used to the benefit of those people. For example, biometric data may be used to conveniently and reliably identify and/or authenticate the identity of people, access securely stored financial and/or other information associated with the biometric data, and so on. This may allow people to avoid repeatedly providing physical identification and/or other information.

The present disclosure further recognizes that the entities who collect, analyze, store, and/or otherwise use such biometric and/or other personal data should comply with well-established privacy policies and/or privacy practices. Particularly, such entities should implement and consistently use privacy policies and practices that are generally recognized as meeting or exceeding industry or governmental requirements for maintaining security and privately maintaining biometric and/or other personal data, including the use of encryption and security methods that meets or exceeds industry or government standards. For example, biometric and/or other personal data should be collected for legitimate and reasonable uses and not shared or sold outside of those legitimate uses. Further, such collection should occur only after receiving the informed consent. Additionally, such entities should take any needed steps for safeguarding and securing access to such biometric and/or other personal data and ensuring that others with access to the biometric and/or other personal data adhere to the same privacy policies and practices. Further, such entities should certify their adherence to widely accepted privacy policies and practices by subjecting themselves to appropriate third-party evaluation.

Additionally, the present disclosure recognizes that people may block the use of, storage of, and/or access to biometric and/or other personal data. Entities who typically collect, analyze, store, and/or otherwise use such biometric and/or other personal data should implement and consistently prevent any collection, analysis, storage, and/or other use of any biometric and/or other personal data blocked by the person from whom such biometric and/or other personal data is derived.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A modular biometric station, comprising:
   a core unit comprising:
      at least a top connector and
      a bottom connector; and
      circuitry operable
         to detect power requirements of at least one component coupled to at least one of the top connector or the bottom connector and provide power according to the power requirements;
   a module end cap that is communicably and electrically coupled to a first of the top connector and the bottom connector and incudes a first lighting component;
   a standalone end cap that is communicably and electrically coupled to a second of the top connector and the bottom connector and includes a second lighting component; and
   a module that is communicably and electrically coupled to the first of the top connector and the bottom connector via the module end cap;
   wherein the module includes a biometric sensor.

2. The modular biometric station of claim 1, wherein:
   the standalone end cap is a first standalone end cap;
   the module end cap is non-destructively removable from the first of the top connector and the bottom connector; and
   a second standalone end cap is configured to communicably and electrically couple to the first of the top connector and the bottom connector after the module end cap is non-destructively removed.

3. The modular biometric station of claim 1, wherein the top connector and the bottom connector are universal serial bus connectors.

4. The modular biometric station of claim 1, wherein the core unit further comprises a first side connector and a second side connector.

5. The modular biometric station of claim 4, wherein the first side connector is positioned on an opposite side of the core unit from the second side connector.

6. The modular biometric station of claim 1, wherein the core unit further comprises:
   a display;
   at least one camera; and
   at least one third lighting component.

7. The modular biometric station of claim 6, wherein the core unit is operable to use the at least one camera to perform facial recognition.

8. The modular biometric station of claim 1, wherein the module includes a fingerprint scanner.

9. The modular biometric station of claim 1, wherein the module is operable to perform glasses detection.

10. The modular biometric station of claim 1, wherein the standalone end cap is operable to cover at least one of the top connector or the bottom connector.

11. The modular biometric station of claim 1, wherein:
    the first lighting component is operable to perform a first lighting function; and
    the second lighting component is operable to perform a second lighting function.

12. The modular biometric station of claim 1, wherein the core unit further comprises an ambient light sensor.

13. A modular biometric station, comprising:
    a core unit comprising:
       at least a top connector and a bottom connector; and
       circuitry operable to detect power requirements of at least one component coupled to at least one of the top connector or the bottom connector and provide power according to the power requirements; and
    a standalone end cap that is communicably and electrically coupled to one of the top connector and the bottom connector and includes a first lighting component;
    wherein:
    the standalone end cap is non-destructively removable from the one of the top connector and the bottom connector; a module end cap that includes a second lighting component is configured to communicably and electrically couple to the one of the top connector and the bottom connector after the standalone end cap is non-destructively removed; and
    a module that is configured to communicably and electrically couple to the one of the top connector and the bottom connector via the module end cap;
    wherein the module includes a biometric sensor.

14. The modular biometric station of claim 13, wherein the core unit is operable to perform biometric identification.

15. The modular biometric station of claim 13, wherein:
    the core unit is operable to perform a first type of biometric identification; and
    the core unit is operable to use the module to perform a second type of biometric identification when the module is communicably and electrically coupled to the one of the top connector and the bottom connector via the module end cap.

16. The modular biometric station of claim 13, wherein the core unit is operable to communicate with a biometric identification system.

17. The modular biometric station of claim 13, wherein the core unit is operable to perform glasses detection.

18. A modular biometric station system, comprising:
    a core unit comprising:
       a display; at least one camera;
       at least one lighting component;
       at least a top port and a bottom port; and
       circuitry operable to detect power requirements of at least one component coupled to at least one of the top port or the bottom port and provide power according to the power requirements;
    a number of modules;

a standalone end cap that is communicably and electrically coupleable to at least one of the top port or the bottom port; and at least one module end cap that is:
communicably and electrically coupleable to at least one of the top port or the bottom port;
communicably and electrically coupleable to the number of modules; and operable to communicably and electrically connect a module of the number of modules and the core unit while connected to the module of the number of modules and the core unit;
wherein the module includes a biometric sensor.

19. The system of claim 18, wherein:
the at least one lighting component is a first lighting component; and
the module includes a second lighting component.

20. The system of claim 18, wherein the module includes a fingerprint scanner.

21. The system of claim 18, wherein the module is operable to perform glasses detection.

22. The system of claim 18, wherein the standalone end cap is operable to cover at least one of the top port or the bottom port.

23. The system of claim 18, wherein the core unit is operable to use the at least one camera to perform facial recognition.

24. The system of claim 18, wherein:
the at least one lighting component is a first lighting component that is operable to perform a first lighting function; and
the module includes a second lighting component that is operable to perform a second lighting function.

* * * * *